(12) United States Patent
Grimaud

(10) Patent No.: US 12,724,957 B1
(45) Date of Patent: Sep. 1, 2026

(54) FORMAL TRANSFORMER: SYSTEM AND METHOD FOR DETERMINISTICALLY TRANSFORMING DOCUMENTS INTO MULTIPLE REPRESENTATIONS AND AUTOMATED CONTROL OF DOWNSTREAM AUTOMATED SYSTEM EXECUTION

(71) Applicant: Jean-Jacques Grimaud, Winchester, MA (US)

(72) Inventor: Jean-Jacques Grimaud, Winchester, MA (US)

( * ) Notice: Subject to any disclaimer, the term of this patent is extended or adjusted under 35 U.S.C. 154(b) by 0 days.

(21) Appl. No.: 19/569,301

(22) Filed: Mar. 17, 2026

(51) Int. Cl.
*G06F 40/157* (2020.01)
*G06V 30/414* (2022.01)

(52) U.S. Cl.
CPC .......... *G06F 40/157* (2020.01); *G06V 30/414* (2022.01)

(58) Field of Classification Search
None
See application file for complete search history.

(56) References Cited

U.S. PATENT DOCUMENTS 9,043,759 B1 * 5/2015 Lininger ............. G06F 11/3672 717/124
10,628,584 B1 * 4/2020 Norton ................ G06F 11/3604
2011/0029546 A1 * 2/2011 Mineno ................. G06F 16/258 707/756
2015/0339269 A1 * 11/2015 Konchitsky ........... G06F 16/345 715/211
2020/0073984 A1 * 3/2020 Sen ....................... G06F 16/243
2021/0357585 A1 * 11/2021 Surdeanu ............. G06F 16/245
2023/0113783 A1 * 4/2023 Le ............................ G06F 8/51 717/137
2025/0284268 A1 * 9/2025 Tan .................. G05B 19/41865
2025/0328321 A1 * 10/2025 Bush ......................... G06F 8/36
2026/0017587 A1 * 1/2026 Kinross ............ G06Q 10/06316

* cited by examiner

*Primary Examiner* — Paras D Shah
*Assistant Examiner* — Jacob B Vogt
(74) *Attorney, Agent, or Firm* — Richard A Baker, Jr.

(57) ABSTRACT

In one embodiment, the Formal Transformer comprises a computer-implemented system configured to deterministically transform a document into a plurality of independent formal representation views governed by predefined operator grammars and constraints, and to automatically govern downstream automated system execution based on multi-representation admissibility evaluation. The document transformation system constructs independent formal representations under predefined operator grammars, preserves uncertainty explicitly, and generates machine-readable control signals that automatically govern downstream automated system execution, such that initiation of execution occurs only when representation-specific admissibility requirements are satisfied.

12 Claims, 3 Drawing Sheets

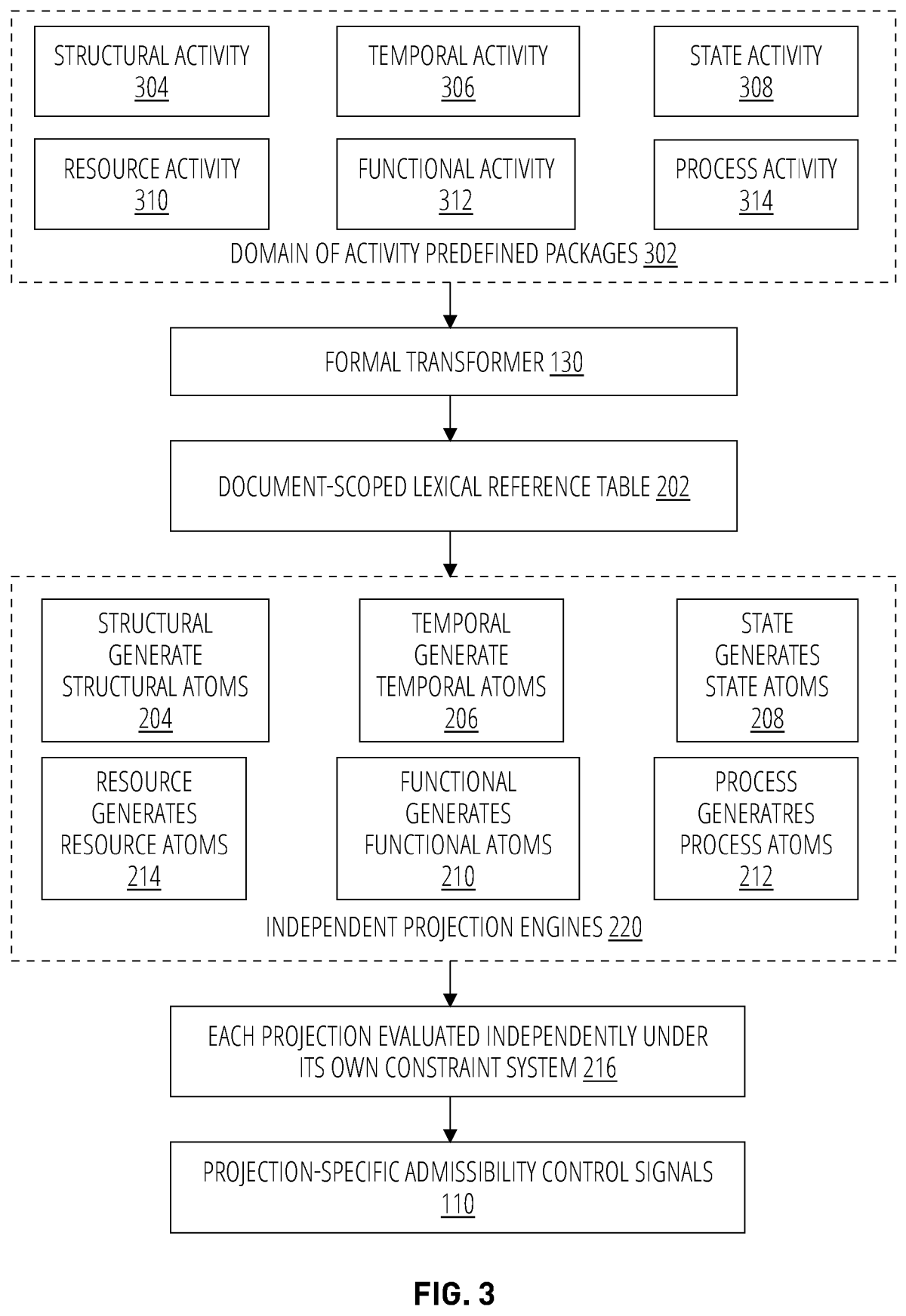

STRUCTURAL ACTIVITY 304

TEMPORAL ACTIVITY 306

STATE ACTIVITY 308

RESOURCE ACTIVITY 310

FUNCTIONAL ACTIVITY 312

PROCESS ACTIVITY 314

DOMAIN OF ACTIVITY PREDEFINED PACKAGES 302

FORMAL TRANSFORMER 130

DOCUMENT-SCOPED LEXICAL REFERENCE TABLE 202

STRUCTURAL GENERATE STRUCTURAL ATOMS 204

TEMPORAL GENERATE TEMPORAL ATOMS 206

STATE GENERATES STATE ATOMS 208

RESOURCE GENERATES RESOURCE ATOMS 214

FUNCTIONAL GENERATES FUNCTIONAL ATOMS 210

PROCESS GENERATRES PROCESS ATOMS 212

INDEPENDENT PROJECTION ENGINES 220

EACH PROJECTION EVALUATED INDEPENDENTLY UNDER ITS OWN CONSTRAINT SYSTEM 216

PROJECTION-SPECIFIC ADMISSIBILITY CONTROL SIGNALS 110

FIG. 3

FORMAL TRANSFORMER: SYSTEM AND METHOD FOR DETERMINISTICALLY TRANSFORMING DOCUMENTS INTO MULTIPLE REPRESENTATIONS AND AUTOMATED CONTROL OF DOWNSTREAM AUTOMATED SYSTEM EXECUTION

FIELD OF THE INVENTIONS

This document relates to computer-implemented systems and methods for deterministic transformation of digital documents into multiple formal representation views under predefined operator grammars, and for automatic control of downstream automated system execution, including conditional enablement or inhibition of machine-implemented operations based on formal multi-representation constraint satisfaction.

BACKGROUND

Many computer-implemented systems operate on documents authored in natural language that exhibit complex internal structure, conditional relationships, and implicit constraints. Such documents may include defined entities, roles, events, temporal conditions, state transitions, resource limitations, procedural dependencies, and domain-specific technical expressions.

These documents arise in a wide range of domains, including product analysis, engineering specifications, pharmaceutical, scientific or technical documentation, banking or governance. In these domains, documents are frequently transformed into structured data for use by automated processing systems whose correctness depends on the completeness and structural validity of the derived data.

Existing automated document transformation systems frequently rely on statistical inference, heuristic normalization, or semantic interpretation to generate structured representations used by downstream automated processing systems. In doing so, such systems may silently infer or approximate missing information, merge distinct conceptual dimensions, or suppress explicit uncertainty. As a result, downstream automated systems may initiate execution based on representations that do not satisfy the structural or constraint requirements assumed by those systems, leading to incorrect initiation of execution despite formally incomplete or invalid representations.

Accordingly, there exists a need for a deterministic, formally governed document transformation system that constructs independent formal representations under predefined operator grammars, preserves uncertainty explicitly, and generates machine-readable control signals that automatically govern downstream automated system execution, such that initiation of execution occurs only when representation-specific admissibility requirements are satisfied.

BRIEF SUMMARY

In one aspect, a computer-implemented method for controlling initiation of an automated downstream machine process based on formal completeness of a natural-language document, the computer-implemented method includes providing, prior to receipt of the natural-language document and for a transformation run executed by one or more processors, a predefined projection definition package includes six immutable fixed operator grammars respectively associated with a structural projection, a temporal projection, a state-based projection, a resource-oriented projection, a functional projection, and a process-based projection, each within a domain of activity. The computer-implemented method also includes providing, prior to receipt of the natural-language document and for a transformation run executed by one or more processors, a predefined projection definition package includes six projection-specific canonical dictionaries each exclusively associated with a respective one of the six immutable fixed operator grammars. The computer-implemented method also includes providing, prior to receipt of the natural-language document and for a transformation run executed by one or more processors, a predefined projection definition package includes where each immutable fixed operator grammar defines a finite and closed set of permissible operators and associated operand schemas selectable during the transformation run, each canonical dictionary includes a finite predefined set of canonical symbols and associated surface-form mappings, each canonical dictionary defines a separate canonical symbol namespace inaccessible to other projection engines during the transformation run, canonical symbols and operators of one projection are not addressable, referenceable, or usable by any other projection during the transformation run, the predefined projection definition package is version-identified, and the predefined projection definition package is not modified during the transformation run. The computer-implemented method also includes instantiating, for the transformation run, six independent projection engines respectively associated with the six immutable fixed operator grammars and their exclusively associated canonical dictionaries. The computer-implemented method also includes receiving, by the one or more processors, the natural-language document includes natural-language text. The computer-implemented method also includes segmenting, by deterministic parsing rules executed by the one or more processors and without probabilistic, heuristic, or learning-based inference, the natural-language document into identifiable lexical units and document units. The computer-implemented method also includes independently for each of the six independent projection engines, deterministically binding each lexical unit of the natural-language document, as segmented, exclusively through direct canonical dictionary lookup to canonical symbols of each exclusively associated canonical dictionaries using deterministic lookup rules and predefined precedence rules and tie-breaking rules, where binding excludes semantic inference, similarity matching, probabilistic ranking, heuristic disambiguation, and cross-projection reconciliation. The computer-implemented method also includes providing, prior to receipt of the natural-language document and for a transformation run executed by one or more processors, a predefined projection definition package includes ambiguous bindings under the predefined precedence rules result in rejection of each lexical unit that is ambiguous for that projection. The computer-implemented method also includes providing, prior to receipt of the natural-language document and for a transformation run executed by one or more processors, a predefined projection definition package includes lexical units lacking a predefined canonical binding result in rejection of each lexical unit that lacks the predefined canonical binding for that projection. The computer-implemented method also includes providing, prior to receipt of the natural-language document and for a transformation run executed by one or more processors, a predefined projection definition package includes rejection of a lexical unit for a projection prevents generation of any projection-specific atom dependent on that lexical unit within that projection engine. The computer-implemented method also includes providing, prior to receipt of the natural-language document and for a transformation run executed by one or more processors, a predefined projection definition package includes canonical binding for one projection engine is performed without reference to canonical bindings, intermediate symbolic representations, or canonical symbol selections of any other projection engine deterministically generating, within each projection engine and using only its respective predefined immutable fixed operator grammar and exclusively associated canonical dictionary, a representation view for each of the six independent projection engines, where each representation view constitutes an independent formal projection of the natural-language document under its respective predefined immutable fixed operator grammar. The computer-implemented method also includes providing, prior to receipt of the natural-language document and for a transformation run executed by one or more processors, a predefined projection definition package includes each representation view includes a plurality of projection-specific atoms including an operator selected from the finite and closed set of permissible operators, one or more operands corresponding to canonical symbols of the each exclusively associated canonical dictionaries, and a provenance reference identifying a source location within the natural-language document. The computer-implemented method also includes providing, prior to receipt of the natural-language document and for a transformation run executed by one or more processors, a predefined projection definition package includes generation of any representation view does not modify, reinterpret, depend upon, or share canonical symbols, operators, or constraint logic with any other projection. The computer-implemented method also includes providing, prior to receipt of the natural-language document and for a transformation run executed by one or more processors, a predefined projection definition package includes no probabilistic, heuristic, or learning-based inference is performed during generation of each representation view. The computer-implemented method also includes emitting, within each projection engine, a projection-scoped canonical unknown symbol conforming to an operand schema defined by its respective predefined immutable fixed operator grammar, without inferring a value or substituting a default value. The computer-implemented method also includes when required by a predefined document domain classification, instantiating one or more additional projection engines, each additional projection engine being exclusively associated with its respective predefined immutable fixed operator grammar defining a finite closed operator set. The computer-implemented method also includes providing, prior to receipt of the natural-language document and for a transformation run executed by one or more processors, a predefined projection definition package includes a respective projection-specific canonical dictionary defining the separate canonical symbol namespace inaccessible to other projection engines. The computer-implemented method also includes providing, prior to receipt of the natural-language document and for a transformation run executed by one or more processors, a predefined projection definition package includes where each additional projection engine operates independently of the six independent projection engines, no operator, canonical symbol, or constraint logic of an additional projection engine is shared with or referenceable by any other projection engine, and each additional projection engine participates in admissibility determination through its own projection-specific constraint system without modifying representation views of the six independent projection engines. The computer-implemented method also includes determining admissibility of a derived artifact by evaluating projection-specific constraint systems defined exclusively within their respective predefined immutable fixed operator grammars across the representation views of the six independent projection engines. The computer-implemented method also includes providing, prior to receipt of the natural-language document and for a transformation run executed by one or more processors, a predefined projection definition package includes any instantiated domain-specific representation views. The computer-implemented method also includes generating, by the one or more processors, an execution-control artifact includes a transformation run identifier. The computer-implemented method also includes providing, prior to receipt of the natural-language document and for a transformation run executed by one or more processors, a predefined projection definition package includes identifiers of operator grammar versions and canonical dictionary versions applied during the transformation run. The computer-implemented method also includes providing, prior to receipt of the natural-language document and for a transformation run executed by one or more processors, a predefined projection definition package includes for each representation view, a projection-specific admissibility control signal indicating whether projection-specific constraints are satisfied. The computer-implemented method also includes providing, prior to receipt of the natural-language document and for a transformation run executed by one or more processors, a predefined projection definition package includes an aggregated execution authorization indicator derived deterministically from the projection-specific admissibility control signals. The computer-implemented method also includes after generating the projection-specific admissibility control signals and the aggregated execution authorization indicator, modifying, by the one or more processors, an execution authorization state associated with the automated downstream machine process. The computer-implemented method also includes when the aggregated execution authorization indicator indicates inadmissibility for at least one required projection, preventing propagation of a machine execution trigger signal at a control boundary between an execution scheduler and an execution unit such that no machine-executable instruction sequence is dispatched. The computer-implemented method also includes when the aggregated execution authorization indicator indicates admissibility across required projections, permitting propagation of the machine execution trigger signal along a defined execution path. The computer-implemented method also includes transmitting the execution-control artifact to the automated downstream machine process irrespective of admissibility status. The computer-implemented method also includes the generation of each representation view, and the aggregated execution authorization indicator is a deterministic function of the content of the natural-language document and the version-identified projection definition package, and excludes probabilistic, heuristic, or learning-based inference during the transformation run.

The computer-implemented method may also include generating the representation views where it does not add semantic meaning, interpretative content, or material information not explicitly present in the natural-language document. The computer-implemented method may also include where each representation-specific atom includes the provenance reference identifying the source location within the natural-language document. The computer-implemented method may also include where explicit unknown elements are typed according to the representation view in which they are emitted. The computer-implemented method may also include where a summary artifact identifies at least one of: unresolved unknown elements, constraint violations, or inadmissibility of one or more representation views. The computer-implemented method may also include no projection-specific canonical symbol selection, projection-specific atom, or projection-specific constraint evaluation state generated by one projection engine is accessible to any other projection engine during the transformation run.

In one aspect, a system includes one or more processors and memory storing instructions that, when executed, cause the system to perform any one of the above computer-implemented methods. Other technical features may be readily apparent to one skilled in the art from the following figures, descriptions, and claims.

BRIEF DESCRIPTION OF THE DRAWINGS

To easily identify the discussion of any particular element or act, the most significant digit or digits in a reference number refer to the figure number in which that element is first introduced.

FIG. 3 illustrates a domain of activity predefined packages with their specific versioned contents.

DETAILED DESCRIPTION

Figure 1:
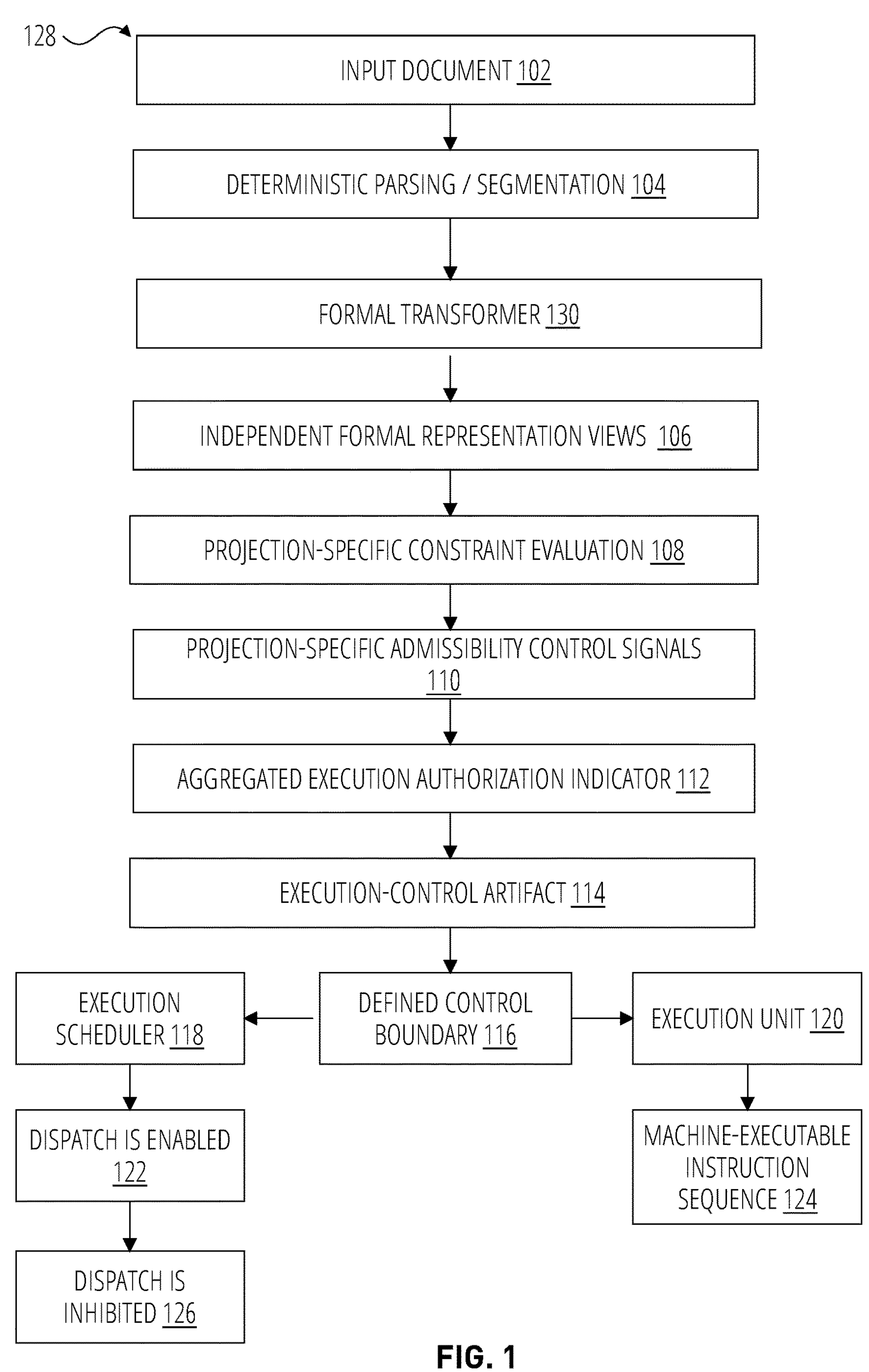
FIG. 1 illustrates an example Formal Transformer architecture.

Detailed descriptions of several embodiments are provided herein. It is to be understood, however, that the present inventions may be embodied in various forms. Therefore, specific details disclosed herein are not to be interpreted as limiting, but rather as a basis for the claims and as a representative basis for teaching one skilled in the art to employ the present inventions in virtually any appropriately detailed system, structure, or manner.

In one embodiment, the formal transformer 130 comprises a computer-implemented document transformation system 128 configured to deterministically transform a document into a plurality of independent formal representation views governed by predefined operator grammars and constraints, and to automatically govern downstream automated system execution based on multi-representation admissibility evaluation.

Mandatory Core Representation Views

The document transformation system 128 generates a mandatory minimal core set of representation views comprising a structural representation view, a temporal representation view, a state-based representation view, a resource-oriented representation view, a functional representation view, and a process-based representation view.

Each core representation view corresponds to a distinct conceptual dimension of the document and is generated deterministically from the document content without probabilistic inference, heuristic completion, or learning-based estimation.

Each representation view is generated using a projection-specific canonical dictionary comprising a finite predefined set of canonical symbols exclusively associated with the respective operator grammar, such that canonical symbols are not shared across projections.

The projection definition package, including operator grammar and canonical dictionary, is version-identified and immutable during a transformation run.

Domain-Specific Representation Extensions

When a document contains domain-specific technical constructs not fully expressible within the mandatory core representation views, the document transformation system 128 may generate one or more additional domain-specific representation views, each governed by its own predefined operator grammar and constraints.

Each domain-specific representation view constitutes an independent formal projection of the document such that its derivation does not modify, reinterpret, or override the atoms or constraints of any pre-existing representation view.

Execution-Control Artifacts, Admissibility and Execution Governance

For each transformation run, an execution-control artifact is generated from the complete set of representation views. The execution-control artifact includes a machine-readable control signal.

An execution-control artifact is admissible for execution if and only if all mandatory core representation views and all applicable domain-specific representation views satisfy their respective representation-specific constraints.

The machine-readable control signal is automatically acted upon to conditionally enable or inhibit initiation of downstream automated system execution associated with the execution-control artifact, such that execution is prevented when representation-specific admissibility requirements are not satisfied.

A summary artifact may be generated exclusively from the representation views and identifies unresolved unknowns, constraint violations, and admissibility determinations without introducing information not expressible within the representations.

FIG. 1 illustrates an example Formal Transformer architecture in which a document is deterministically parsed and transformed into a mandatory core set of independent formal representation views generated under projection-specific fixed operator grammars and projection-specific canonical dictionaries. Each projection is evaluated under projection-specific constraints to generate projection-specific admissibility control signals and an aggregated execution authorization indicator. The document transformation system 128 emits an execution-control artifact 114 used to enable or inhibit downstream execution at a defined control boundary between an execution scheduler 118 and an execution unit 120. As used in this figure, "dispatch" refers to propagation of a machine-executable instruction sequence from the execution scheduler 118 to the execution unit 120 across the defined control boundary 116.

The input document 102 is a structured of semi-structured technical document. The input document 102 is sent to the deterministic parsing/segmentation 104. The deterministic parsing/segmentation 104 uses predetermined parsing rules to parse and segment the document without using probabilistic, heuristic, or learning inference. The parsed and segmented document is then sent to the formal transformer 130 (transformation run) to forward to the projection definition package(s), which are version-identified and immutable during the run.

The transformed document is then sent through a core set of independent formal representation views 106. Each view generates a canonical dictionary, under its own fixed operator grammar and projection-specific rules. During this process, there is no cross-projection canonical symbol sharing or addressability. These views include structural, temporal, state-based, resource-oriented, functional, and process-based. Optionally, there may be additional domain-specific views.

After being processed by each view, the document is sent for projection-specific constraint evaluation 108. With the projection-specific constraint evaluation 108, each projection is evaluated exclusively under its own constraint system. Next, projection-specific admissibility control signals 110 are generated (CS_struct, CS_temp, CS_state, CS_res, CS_func, CS_proc, and any domain CS). An aggregated execution authorization indicator 112 (AEA) is calculated from the deterministic aggregation of the control signals)|

$$AEA \in \{ENABLE\_EXECUTION, INHIBIT\_EXECUTION\}$$

Finally, an execution-control artifact 114 is generated. The 114 is a machine-readable artifact that includes representation views+control signals+aggregated execution authorization indicator+provenance/version identifiers.

The execution-control artifact 114 is sent to the defined control boundary 116 to determine if execution is enabled or inhibited. The execution scheduler 118 checks the defined control boundary 116 and dispatch is enabled 122 if AEA is equal to ENABLE_EXECUTION, which triggers propagation. If AEA is equal to INHIBIT_EXECUTION, the dispatch is inhibited 126, and propagation is blocked.

The execution unit 120, when dispatch is permitted, the execution unit 120 initiates the machine-executable instruction sequence 124.

Figure 2:
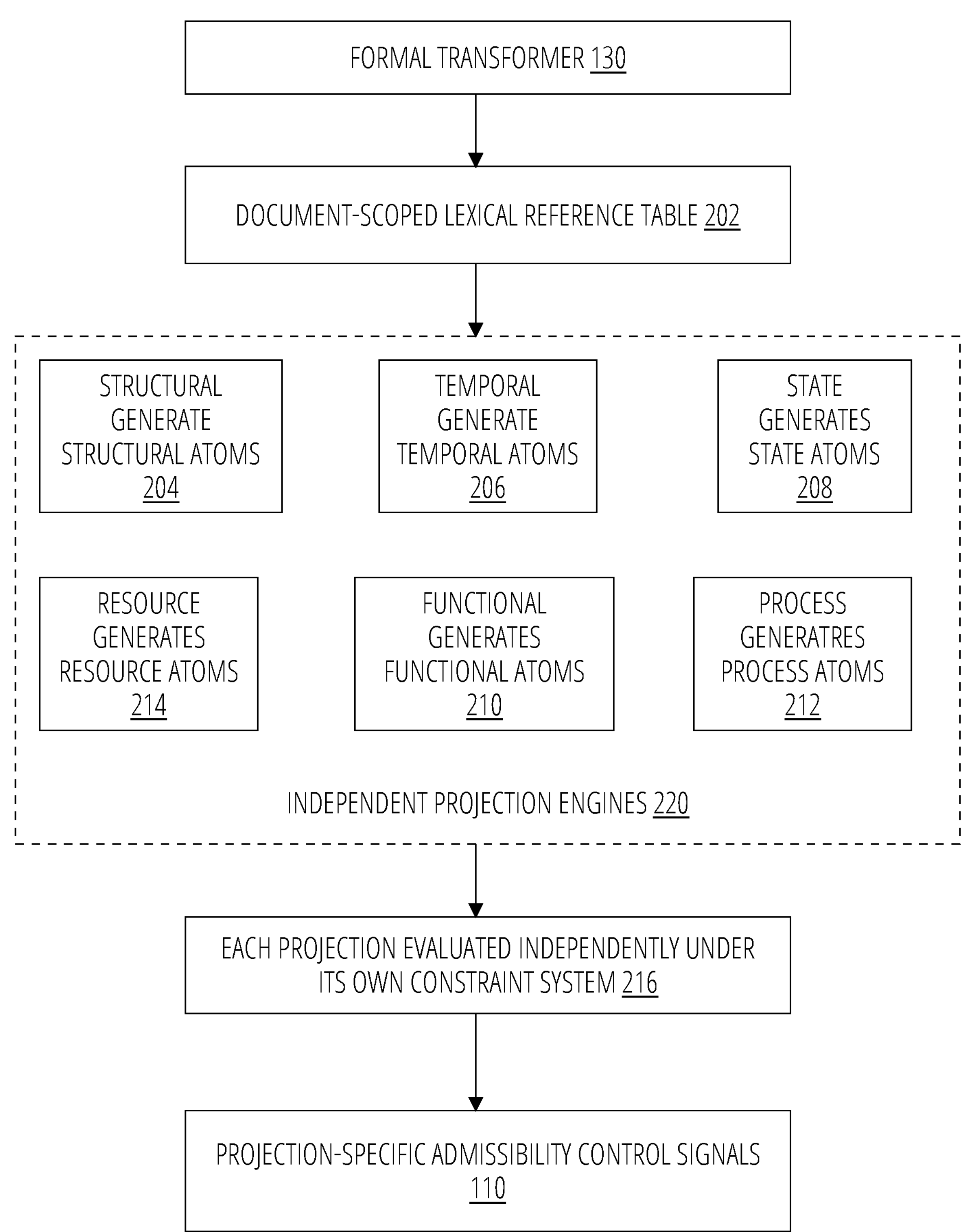
FIG. 2 illustrates the independent projection engines of the Formal Transformer.

FIG. 2 illustrates the independent projection engines of the Formal Transformer. Each projection engine is governed by its own fixed operator grammar and projection-specific canonical dictionary comprising a finite canonical symbol set. Canonical symbols are not shared across projections, and constraint evaluation is performed independently within each projection. The document-scoped lexical reference table provides traceability only and does not constitute a canonical namespace accessible for operator selection or cross-projection constraint evaluation.

In FIG. 2, the document transformation system 128 begins with the formal transformer 130, which creates projection definition packages, version-identified and immutable. These packages are sent to the document-scoped lexical reference table 202, which is used for traceability only. It is not a canonical namespace and is not used for constraint evaluation. The document and the packages are then sent to the independent projection engines 220.

The structural 204 projection engine operates independently, with no cross-projection sharing, and generates structural atoms. The structural 204 projection engine uses fixed operator grammar, a projection-specific canonical dictionary, a finite canonical symbol set, and a set of structural constraints.

The temporal 206 projection engine operates independently, with no cross-projection sharing, and generates temporal atoms. The temporal 206 projection engine uses fixed operator grammar, a projection-specific canonical dictionary, a finite canonical symbol set, and a set of temporal constraints.

The state 208 projection engine operates independently, with no cross-projection sharing, and generates state atoms. The state 208 projection engine uses fixed operator grammar, a projection-specific canonical dictionary, a finite canonical symbol set, and a set of state constraints.

The functional 210 projection engine operates independently, with no cross-projection sharing, and generates functional atoms. The functional 210 projection engine uses fixed operator grammar, a projection-specific canonical dictionary, a finite canonical symbol set, and a set of functional constraints.

The process 212 projection engine operates independently, with no cross-projection sharing, and generates process atoms. The process 212 projection engine uses fixed operator grammar, a projection-specific canonical dictionary, a finite canonical symbol set, and a set of process constraints.

The resource 214 projection engine operates independently, with no cross-projection sharing, and generates resource atoms. The resource 214 projection engine uses fixed operator grammar, a projection-specific canonical dictionary, a finite canonical symbol set, and a set of resource constraints.

Each projection evaluated independently under its own constraint systems 216. The set of constraints from each projection engine is sent to the projection-specific admissibility control signals 110.

A domain of activity is a bounded declared domain that still feels broad, as non-limiting examples, such as general engineering/technical operations (install, remove, verify, torque, inspect, connect . . . ); general project/process language (approve, review, schedule, notify . . . ); and general compliance/QA language (tolerance, pass/fail, defect, nonconformance . . . )

FIG. 3 illustrates a domain of activity predefined packages with their specific versioned contents for each projection (grammar, dictionary, symbol set, and constraints). Upon receiving a digital document from the domain of activity, a lexical reference table is generated and then processed by the independent projection engines of the formal transformer 130. The document-scoped lexical reference table provides traceability only and does not constitute a canonical namespace accessible for operator selection or cross-projection constraint evaluation.

Each projection engine is governed by its own fixed operator grammar and projection-specific canonical dictionary comprising a finite canonical symbol set. Canonical symbols are not shared across projections, and constraint evaluation is performed independently within each projection. Projection-specific admissibility control signals and machine-readable artifacts are emitted and received by the downstream system(s).

FIG. 3 shows the domain of activity predefined packages 302, including the structural activity 304 predefined package, including the structural fixed operator grammar, the structural specific canonical dictionary, the finite canonical symbol set, and the structural constraints. The domain of activity predefined packages 302 also includes the temporal activity 306 predefined package, including the temporal fixed operator grammar, the temporal specific canonical dictionary, the finite canonical symbol set, and the temporal constraints. The domain of activity predefined packages 302 also includes the state activity 308 predefined package, including the state fixed operator grammar, the state specific canonical dictionary, the finite canonical symbol set, and the state constraints. The domain of activity predefined packages 302 also includes the resource activity 310 predefined package, including the resource fixed operator grammar, the resource specific canonical dictionary, the finite canonical symbol set, and the resource constraints. The domain of activity predefined packages 302 also includes the functional activity 312 predefined package, including the functional fixed operator grammar, the functional specific canonical dictionary, the finite canonical symbol set, and the functional constraints. The domain of activity predefined packages 302 also includes the process activity 314 predefined package, including the process fixed operator grammar, the process specific canonical dictionary, the finite canonical symbol set, and the process constraints.

The formal transformer 130, which creates projection definition packages, version-identified and immutable from the predefined packages. These packages are sent to the document-scoped lexical reference table 202, which is used for traceability only. It is not a canonical namespace and is not used for constraint evaluation. The document and the packages are then sent to the independent projection engines 220, as described in FIG. 2.

1. Document Ingestion and Segmentation

The document transformation system 128 ingests a document 102 in textual form and segments the document 104 into identifiable units such as sections, clauses, paragraphs, lists, and tables. Each unit is assigned a unique identifier to enable traceability. In some embodiments, document segmentation, token identification, and syntactic structure recognition are performed using deterministic rule-based parsing techniques, such that identification of document units and symbols does not rely on probabilistic inference, heuristic completion, or learning-based estimation.

2. Document-Scoped Lexical Reference Table

The document transformation system 128 constructs a document-scoped lexical reference table 202 used exclusively for traceability and source identification. The document-scoped lexical reference table 202 is distinct from, and not part of, any projection-specific canonical symbol namespace.

The document-scoped lexical reference table 202 is not accessible for operator selection, canonical binding, constraint evaluation, or admissibility determination within any projection engine.

Each lexical entry is assigned a stable internal identifier for traceability within the transformation run. When a reference cannot be uniquely resolved at the lexical level, an explicit unresolved lexical entry is generated.

Each processed document is associated with a document identifier, and representation-specific atoms generated by the independent projection engines 220 include provenance references to the document identifier.

3. Representation Views

The document transformation system 128 generates representation views from the segmented document units. Each representation view is independent and governed by a predefined operator grammar comprising a finite set of permissible operators and associated operand schemas. For a given transformation run, the operator grammar applicable to a representation view is fixed and remains unchanged during the generation of that representation view. The grammar is not extended, modified, or inferred based on document content. Any modification to an operator grammar occurs only through explicit version updates external to a transformation run.

Selection of an operator from the predefined operator grammar for a given document-derived construct is performed using deterministic mapping rules based on syntactic structure, symbol categorization, and operand compatibility constraints. Operator selection does not rely on probabilistic inference, heuristic ranking, or learning-based classification, even as the size of the operator grammar increases.

Canonical symbol binding and operator selection are performed exclusively through direct projection-specific dictionary lookup under predefined precedence and tie-breaking rules. Ambiguous or undefined bindings result in rejection within the respective projection.

In some embodiments, operator grammars for the mandatory core representation views are centrally defined and version-controlled, such that modifications to the grammar occur only through explicit updates external to a transformation run. This central control ensures deterministic operator selection and prevents dynamic alteration of permissible operators during document processing.

3.1 Core Representation Views

The mandatory core representation views include structural, temporal, state-based, resource-oriented, functional, and process-based representation views, each capturing its respective conceptual dimension.

Each representation view consists of representation-specific atoms comprising an operator, operands, and a provenance reference.

For purposes of the present disclosure, a representation-specific atom (or "atom") is a discrete formal data element generated within a particular representation view under that view's operator grammar. An atom comprises an operator selected from the operator grammar applicable to the representation view, one or more operands referencing symbols in the document-scoped lexical reference table or literals expressed in the document, and a provenance reference identifying a source location within the document. Atoms are specific to the representation view in which they are generated and are not shared across different representation views. A given word or document unit may give rise to distinct atoms in multiple representation views, each such atom being governed exclusively by the operator grammar and constraints of its respective representation view.

Each mandatory projection engine is instantiated for every transformation run. A projection engine may generate a representation view containing zero atoms if no canonical bindings occur; such a representation view is nevertheless evaluated under its projection-specific constraint system.

Canonical symbol binding is performed exclusively through direct projection-specific dictionary lookup using predefined precedence and tie-breaking rules; ambiguous or undefined bindings result in rejection within that projection.

Illustrative Operator Grammars for the Core Projections (Non-Limiting). In some embodiments, each representation view is generated as an independent formal projection of the input document, wherein each projection is governed by a fixed operator grammar and projection-specific operand constraints. Each projection is populated by representation-specific atoms derived deterministically from identified document content and the document-scoped lexical reference table, without inference, estimation, or synthesis of missing information.

Atom schema (common across projections). In some embodiments, an atom in any representation view conforms to a schema of the form:

ATOM:=OPERATOR(OPERANDS . . . )@PROVENANCE where OPERATOR is selected from the operator grammar of the projection, OPERANDS reference symbols in the shared symbol table and/or literals expressed in the document, and PROVENANCE identifies a source location in the document sufficient to enable traceability.

Typed unknowns. When an operand required by an operator or constraint is not specified by the document, the document transformation system 128 emits a typed unknown within the projection, rather than inferring a value. In some embodiments, typed unknowns are projection-specific, such as UNKNOWN_STRUCTURAL, UNKNOWN_TEMPORAL, UNKNOWN_STATE, UNKNOWN_RESOURCE, UNKNOWN_FUNCTIONAL, and UNKNOWN_PROCESS, and are treated as first-class elements for admissibility determination.

(i) Structural 204 Projection—Illustrative Operators

The structural projection captures entities, composition, containment, connectivity, and structural attributes as expressed in the document.

Illustrative operator grammar (non-limiting):

INSTANCE_OF(entity, type)

COMPOSES(whole, part)

CONTAINS(container, contained)

HAS_ATTRIBUTE(entity, attribute type, value_or_unknown)

HAS_CONSTRAINT(entity, constraint type, constraint_value_or_unknown)

Illustrative structural admissibility constraints (non-limiting):

referenced entities SHALL exist in the symbol table;

required structural attributes SHALL not be typed unknown when required by a structural constraint;

composition and containment relations SHALL satisfy predefined integrity constraints.

(ii) Functional 210 Projection—Illustrative Operators

The functional projection captures functional relationships, responsibilities, and functional effects expressed in the document.

Illustrative operator grammar (non-limiting):

PERFORMS(actor, function, target_or_object)

REQUIRES_FUNCTION(function, prerequisite_function_or_condition)

PRODUCES_EFFECT(function, effect)

SATISFIES_REQUIREMENT(function, requirement_id_or_symbol)

Illustrative functional admissibility constraints (non-limiting):

required actors/targets SHALL be resolved or explicitly marked unresolved;

required functional preconditions SHALL not be missing when mandatory for execution enablement.

(iii) Process 212 Projection—Illustrative Operators

The process projection captures sequences, steps, procedural dependencies, and gating conditions expressed in the document.

Illustrative operator grammar (non-limiting):

STEP(step_id, action, actor, target_or_object)

PRECEDES(step_id_A, step_id_B)

DEPENDS_ON(step_id, dependency)

TRIGGER(step_id, condition_or_event)

Illustrative process admissibility constraints (non-limiting):

each referenced step_id SHALL be uniquely identifiable;

required dependencies SHALL be present or represented as typed unknowns;

prohibited cycles SHALL be detected according to predefined process constraints.

(iv) Temporal 206 Projection—Illustrative Operators

The temporal projection captures time conditions, durations, deadlines, temporal windows, and temporal constraints expressed in the document.

Illustrative operator grammar (non-limiting):

OCCURS_DURING(event_or_step, time_window_or_phase)

HAS_DURATION(event_or_step, duration_or_unknown)

DEADLINE(entity_or_event, deadline_or_unknown)

TEMPORAL_LIMIT(event_or_condition, limit_value_or_unknown)

Illustrative temporal admissibility constraints (non-limiting):

required duration or limit values SHALL not be typed unknown when a temporal integrity constraint requires them;

temporal constraints SHALL satisfy predefined bounds or compatibility rules.

(v) State 208 Projection—Illustrative Operators

The state projection captures operational states, state transitions, and state preconditions/postconditions expressed in the document.

Illustrative operator grammar (non-limiting):

STATE_OF(entity, state_label)

TRANSITION(entity, from_state, to_state, trigger_or_condition)

REQUIRES_STATE(event_or_step, required_state)

PRODUCES_STATE(event_or_step, resulting_state)

Illustrative state admissibility constraints (non-limiting):

required states SHALL be defined or represented as typed unknowns;

transitions SHALL satisfy predefined state-machine integrity constraints.

(vi) Resource 214 Projection—Illustrative Operators

The resource projection captures resource requirements, allocations, consumption limits, and resource constraints expressed in the document.

Illustrative operator grammar (non-limiting):

REQUIRES_RESOURCE(event_or_step, resource_type, amount_or_unknown)

CAPACITY(resource_type, capacity_value_or_unknown)

CONSUMES(event_or_step, resource_type, amount_or_unknown)

RESOURCE_LIMIT(resource_type, limit_value_or_unknown)

Illustrative resource admissibility constraints (non-limiting):

resource requirements SHALL not exceed specified capacities when capacities are required and present;

required resource quantities SHALL not be typed unknown when mandated by a resource constraint.

Cross-projection coexistence. A given word, phrase, or document unit may contribute atoms to multiple projections, including structural, functional, process-based, temporal, state-based, and resource-oriented projections. Such coexistence does not imply that the projections share a common Euclidean coordinate system; rather, each projection is generated under its own operator grammar and constraints as an independent formal projection of the same identified document content.

Role in admissibility. In some embodiments, admissibility of an execution-control artifact is determined by evaluating representation-specific constraints across the mandatory core projections (and any applicable domain-specific projections), and execution associated with an execution-control artifact is enabled only when admissibility is satisfied.

3.2 Handling of Non-Expressible Representations

Each mandatory projection engine is instantiated for every transformation run. If no canonical bindings are generated for a given projection, the projection engine produces an empty representation view and evaluates admissibility under its projection-specific constraint system. An empty representation view is admissible unless its projection-specific constraints require the presence of one or more atoms.

3.3 Domain-Specific Representation Views

When required by the document domain, additional representation views may be generated to capture technical constructs such as mathematical relationships, physical constraints, logical formalisms, or other domain-specific structures whose correctness depends on formal grammatical or structural rules. Determination that a domain-specific representation view is required is performed using predefined deterministic domain-identification rules based on the presence of domain-declared symbols, formal domain constructs, structural markers, or explicit domain metadata within the document.

A domain-specific representation view is introduced only when the document relies on formal domain objects whose admissibility, internal consistency, or correctness depends on domain-specific operator grammars, set membership rules, closure properties, or invariants that cannot be expressed as functional input-output behavior alone. In such cases, the domain-specific representation view is governed by its own operator grammar and constraints and constitutes an independent formal projection of the document, such that its derivation does not modify, reinterpret, or override the atoms or constraints of any pre-existing representation view, including the mandatory core representation views and any previously defined domain-specific representation views. Such domain-specific representation views participate in admissibility determination without altering, reinterpreting, or overriding the atoms or constraints of any other representation view.

4. Explicit Unknowns and Non-Inference

When the document does not provide sufficient information to populate an operand or satisfy a constraint, the system emits a typed unknown element rather than inferring or approximating a value. This preserves uncertainty as a first-class artifact and prevents execution based on assumed information.

5. Handling of Referential Expressions

In accordance with the principles of explicit unknowns and non-inference, referential expressions appearing in a document, including personal pronouns and possessives, are treated as explicit references rather than as implicit identifiers. Such references are recorded as they appear in the document and are not assumed to identify a specific entity unless an unambiguous association can be established directly from admissible document content under the applicable operator grammar.

Where a referential expression cannot be uniquely associated with a specific entity, the reference remains explicitly unresolved. No inference, substitution, or synthesis is performed to resolve such references, and their unresolved status is preserved as part of the transformation output. The presence of unresolved referential expressions does not affect the independent derivation of other representations from non-referential content of the document.

In some embodiments, deterministic resolution rules are applied only when they yield a single unambiguous association; otherwise the reference remains explicitly unresolved.

6. Admissibility Determination and Output Semantics

Admissibility of an execution-control artifact 114 is determined by evaluating representation-specific constraints across all mandatory core representation views and all applicable domain-specific representation views.

An execution-control artifact 114 is emitted downstream for automated consumption and optionally human readability, irrespective of admissibility status. When an execution-control artifact 114 is inadmissible due to unresolved unknowns or constraint violations, the document transformation system 128 emits an execution-control artifact 114 comprising projection-specific admissibility control signals and an aggregated execution authorization indicator that inhibits execution associated with the execution-control artifact 114. When an execution-control artifact 114 is admissible, execution associated with the execution-control artifact 114 may be enabled.

In both admissible and inadmissible cases, the execution-control artifact 114 comprises the complete set of representation views generated from the document, together with the admissibility determination, such that selective presentation of representations or of remaining issues is performed downstream without affecting the emitted artifact.

In some embodiments, the execution-control artifact 114 includes run identification metadata comprising a unique transformation run identifier and time metadata, and further includes, for each representation view, an identifier of the operator grammar version applied during the transformation run, each operator grammar version comprising the predefined operators, operand schemas, constraint definitions, and deterministic parsing rules applicable to that representation view. When the same input document is processed under the same run-applicable operator grammar versions and deterministic rules, the resulting representation views, admissibility determination, and execution control signal are reproducible.

In some embodiments, inhibition or enablement of execution is implemented at a defined control boundary 116 between an execution scheduler 118 and an execution unit 120, such that propagation of a machine-executable instruction sequence 124 is prevented when the aggregated execution authorization indicator specifies inhibition.

For purposes of this disclosure, a projection definition package comprises the operator grammar, projection-specific canonical dictionary, operand schemas, constraint definitions, and deterministic parsing rules applicable to a projection during a transformation run.

Generation of each representation view and of the aggregated execution authorization indicator is a deterministic function of (i) the document content and (ii) the version-identified projection definition package applicable to the transformation run.

For purposes of this disclosure, "dispatch" refers to propagation of a machine-executable instruction sequence 124 or execution trigger from an execution scheduler 118 to an execution unit 120 across a defined control boundary 116, such that the execution unit 120 begins processing the instruction sequence. Dispatch does not refer to human notification, data presentation, workflow routing, or informational reporting.

7. Implementation Considerations

The formal transformer 130 is implemented using deterministic parsing rules, operator grammars, and constraint validation. The document transformation system 128 does not rely on probabilistic inference, heuristic completion, or learning-based decision-making.

System-Level Characteristics and Operational Behavior

The document transformation system 128 provides a deterministic and auditable transformation of documents into machine-interpretable representations suitable for controlled downstream execution, an explicit preservation and formal representation of uncertainty through typed unknown elements, preventing implicit inference or silent completion of incomplete specifications, a separation of conceptual dimensions into independent grammar-governed formal projections, enabling constraint validation within distinct operator-grammar domains without cross-modification or reinterpretation, prevention of initiation of downstream machine-implementable processes when representations are structurally, temporally, state-wise, resource-wise, functionally, or procedurally incomplete according to projection-specific constraints, and extensibility to additional technical domains through domain-specific operator grammars, while preserving deterministic behavior and independence of the six mandatory core projections.

Examples Use Cases (Non-Limiting)

Illustrative Structural Example (Non-Limiting)

A mechanical engineer, using a computer-aided design (CAD) system within an engineering environment, completes the design of a pressure vessel for a defined industrial project scheduled for delivery by a specified date. Upon completion of the vessel design, the engineering system issues a corresponding specification document describing a vessel capable of withstanding an internal pressure exceeding a defined threshold and identifying the enclosure material.

Branch A—Structural Representation Complete (Tolerancing Included)

The specification document includes an admissible tolerancing of the thickness of the enclosure wall satisfying predefined mechanical integrity constraints.

Upon processing the specification document, the formal transformer 130 determines that admissibility can be established based on the structural representation.

Accordingly, the formal transformer 130 generates a control signal permitting execution in downstream systems. In this context, execution comprises the inclusion of the vessel in a bill of materials (BOM), the entry of the vessel specifications into a procurement database, and the selection among referenced suppliers of one or more suppliers as primary and secondary sources.

The vessel specification, therefore, progresses to procurement processing within the engineering workflow.

Branch B—Structural Representation Incomplete (Tolerancing not Included)

The specification document does not include an admissible tolerancing of the thickness of the enclosure wall.

Upon processing the specification document, the formal transformer 130 determines that admissibility cannot be established because the structural representation governing mechanical integrity is incomplete.

Accordingly, the formal transformer 130 generates a control signal inhibiting execution in downstream systems.

Following the inhibiting control signal, the generated artifact identifying the missing structural tolerancing is entered into the engineering workflow system, and the artifact is forwarded to the responsible mechanical engineer and section head for completion of the structural representation.

The vessel specification is thereby prevented from inclusion in the BOM and procurement database until admissibility is established. This inhibition prevents the initiation of downstream technical procurement and manufacturing processes that would otherwise rely on structurally incomplete specifications.

Illustrative Temporal Example (Non-Limiting)

An electrical engineer from an electrical company, using an electronic design automation (EDA) system, designs an electrical power module to be manufactured in-house. When the power module design reaches the specification stage, the engineering system issues a corresponding specification document describing structural characteristics, functional behavior, process parameters, resource requirements, operational states, and temporal operating conditions.

Within the company's product development process, engineering progress is gated, and issuance of the product specification constitutes a gate enabling Manufacturing Engineering to initiate planning and methods definition for the product and to develop initial prototypes.

The issued specification document is processed by the formal transformer 130 for admissibility determination across the minimal set of core representations comprising structural, functional, temporal, resource-based, state-based, and process-based representations.

Branch A—all Core Representations Complete (Temporal Constraint Included)

The specification document includes an admissible duration for cumulative transient overcurrent or overvoltage conditions satisfying predefined electrical integrity constraints, and the structural, functional, process-based, resource-based, and state-based representations satisfy their respective predefined constraints.

Upon processing the specification document, the formal transformer 130 determines that admissibility is established across all required core representations.

Accordingly, the formal transformer 130 generates a control signal permitting execution. Following the enabling control signal, the engineering gate is satisfied, the specification document is released to Manufacturing Engineering, manufacturing planning and methods definition for the power module are initiated, and development of initial prototypes may proceed.

The product thereby advances to manufacturing preparation.

Branch B—Temporal Representation Incomplete (Admissible Duration not Included)

The specification document does not include a defined admissible duration for cumulative transient overcurrent or overvoltage conditions, while the structural, functional, process-based, resource-based, and state-based representations are otherwise present.

Upon processing the specification document, the formal transformer 130 determines that admissibility cannot be established due to incomplete temporal representation governing transient electrical stress conditions.

Accordingly, the formal transformer 130 generates a control signal inhibiting execution. Following the inhibiting control signal, the engineering gate remains unsatisfied, Manufacturing Engineering is made aware of the non-enablement of the gate and of the status of the engineering specification for the power module, and does not initiate planning, methods definition, or prototype development, the generated artifact identifying the missing temporal constraint is entered into the company's engineering workflow system, and the artifact is forwarded to the responsible electrical engineer and section head for completion of the specification.

Manufacturing planning and prototype development are thereby prevented until admissibility across all required core representations is established. This inhibition prevents initiation of downstream manufacturing planning processes based on temporally incomplete operational constraints.

Illustrative Process-Based Example (Non-Limiting)

A pharmaceutical development team within a pharmaceutical company prepares a medication for commercial release. Regulatory and product documentation describing the medication are generated by the company's pharmaceutical documentation system and include structural characteristics of the active compound, functional therapeutic indications, temporal dosage parameters, resource-based storage and handling requirements, and defined physiological states associated with administration.

Release of the medication packaging, including inclusion of printed documentation within the package, is gated by completion and approval of the issued documentation.

The issued documentation is processed by the formal transformer 130 for admissibility determination across the minimal set of core representations comprising structural, functional, temporal, resource-based, state-based, and process-based representations.

Branch A—Process-Based Representation Required and Present

The medication requires a defined sequence of administration steps comprising an initial low-dose phase to monitor patient reaction prior to escalation to a regular therapeutic dosage.

In this context, a process-based representation describing the sequence of administration steps is required for admissibility.

The issued documentation includes a defined process-based representation satisfying predefined safety and regulatory constraints, and the structural, functional, temporal, resource-based, and state-based representations satisfy their respective predefined constraints.

Upon processing the documentation, the formal transformer 130 determines that admissibility is established across all required core representations.

Accordingly, the formal transformer 130 generates a control signal permitting execution. Following the enabling control signal, the release gate for medication packaging is satisfied, packaging of the medication proceeds, and the documentation is included within the product packaging for distribution.

Branch B—Process-Based Representation Not Required

The medication does not require a defined sequence of administration steps beyond standard dosage parameters and does not require staged dose escalation.

In this context, a process-based representation is not required for admissibility.

The issued documentation includes structural, functional, temporal, resource-based, and state-based representations satisfying their respective predefined constraints.

Upon processing the documentation, the formal transformer 130 determines that admissibility is established across all required core representations. The process-based projection engine is instantiated for the transformation run and generates a representation view containing no process-specific atoms. The projection-specific constraint system determines that no mandatory process constraints are triggered for the document domain, and the process-based representation is therefore admissible.

Accordingly, the formal transformer 130 generates a control signal permitting execution. Following the enabling control signal, the release gate for medication packaging is satisfied, packaging proceeds, and the documentation is included within the product packaging for distribution.

The absence of a process-based representation in this context does not inhibit execution. In both branches, the determination is performed deterministically under projection-specific operator grammars, thereby preventing release of a product configuration whose process-based safety constraints are incomplete, while permitting release when such constraints are formally determined not to be required.

Structural Projection Fixed Operator Grammar (SP-FOG V1.0)

1) Purpose

The structural projected fixed operator grammar (SP-FOG V1.0) presented here is an example of the predefined packages. Each projection grammar may comprise tens or hundreds of operators governing atom construction, relation formation, validation predicates, and artifact emission. Other grammars are anticipated by this disclosure.

SP-FOG deterministically projects a document into a structural representation view consisting of typed atoms (sections, paragraphs, tables, lists, figures, etc.) and typed relations (contains, follows, references, labels, etc.). It does not infer meaning; it only encodes structure present in the document.

2) Data Model

Atom record (S-Atom). An atom is a tuple:
ATOM(atom_id, atom_type, span, attrs)
atom_id: stable identifier
atom_type: one of the SP-FOG atom types (below)
span: (start_offset, end_offset) in canonicalized document text, or a pointer to a binary object (image region, embedded object)
attrs: key/value attributes (e.g., heading_level=2, table_rows=8)
Relation record (S-Rel) A relation is a tuple:
REL(rel_type, src_atom_id, dst_atom_id, attrs)

3) Operator Set (<60 Operators)

A. Atom Constructors (18 Operators)
1. DOC( )—create the document root atom
2. SEC(level)—section heading atom
3. SUBSEC(level)—subsection heading atom (optional convenience; can be folded into SEC)
4. PARA( )—paragraph atom
5. SENT( )—sentence atom
6. CLAIM( )—claim atom (useful for patents; optional if you want domain-neutral)
7. DEFTERM( )—defined-term atom
8. LIST( )—list container atom
9. LI( )—list item atom
10. TABLE( )—table container atom
11. TR( )—table row atom
12. TD( )—table cell atom
13. FIG( )—figure container atom
14. CAPTION(—caption atom
15. EQU( )—equation/math block atom
16. CODE( )—code block atom
17. QUOTE( )—blockquote atom
18. FOOTNOTE( )—footnote atom B. Structural Relations (12 Operators)
19. CONTAINS(a,b)—hierarchical containment
20. CHILD_OF(a,b)—inverse convenience (optional; can be derived)
21. PARENT_OF(a,b)—inverse convenience (optional; can be derived)
22. FOLLOWS(a,b)—immediate document order
23. PRECEDES(a,b)—inverse convenience (optional; can be derived)
24. NEXT_SIBLING(a,b)—sibling order (optional; can be derived)
25. SAME_LEVEL(a,b)—same hierarchy level (optional; can be derived)
26. HAS_LABEL(a,label)—assigns a label string
27. HAS_NUMBER(a,num)—assigns an ordinal/identifier (e.g., "FIG. 10")
28. HAS_TITLE(a,text)—title text for atom
29. HAS_TEXT(a,text_span)—binds atom to a text span
30. ANCHOR(a,anchor_id)—stable anchor token for referencing C. Reference & Citation Relations (8 Operators)
31. REFERS_TO(a,b)—atom a references atom b
32. CITES(a,b)—citation-like reference
33. LINKS_TO(a,uri)—external link
34. MENTIONS(a,token_span)—mention of token sequence in a span
35. ALIAS(a,alias_text)—alternate name string for a labeled object
36. RESOLVES_TO(mention, target)—deterministic reference resolution result
37. UNRESOLVED_REF(mention)—explicit unresolved reference marker
38. REF_SCOPE(scope_atom, mention)—scope used for deterministic resolution D. Table-Specific Operators (6 Operators)
39. CELL_AT(table, r, c, cell)—mapping
40. ROW_COUNT(table,n)
41. COL_COUNT(table,n)
42. HEADER_ROW(table, r)
43. MERGE_RANGE(table, r1,c1,r2,c2)
44. CELL_TYPE(cell, kind)—e.g., numeric/text/date/empty E. Span & Normalization Operators (8 Operators)
45. CANON_TEXT(doc)—canonicalize text stream (normalization step)
46. SPAN(start,end)—create span pointer
47. TOKENIZE(span)—deterministic tokenization
48. NORM_WS(span)—normalize whitespace
49. NORM_CASE(span, mode)—lower/upper/preserve
50. NORM_NUM(span, mode)—normalize numeric formats
51. NORM_PUNCT(span, mode)—normalize punctuation rules
52. HASH(span, algo)—stable hash for span identity (e.g., SHA-256)

F. Constraint & Validation Operators (8 Operators)
53. ASSERT(pred)—boolean assertion
54. REQUIRES(atom_type, predicate)—type-specific constraint
55. UNIQUE(label_scope, label)—uniqueness constraint
56. ACYCLIC(rel_type)—forbid cycles in a relation graph
57. WELLFORMED_TABLE(table)—table integrity constraints
58. WELLNESTED( )—containment constraints (no illegal overlaps)
59. TOTAL_ORDER(FOLLOWS)—ensures a total order exists
60. EMIT_STRUCT_VIEW(—emits the structural projection artifact for this view 4) Deterministic Parsing Rules (High—Level)
Input: a canonicalized document stream (text+embedded objects)
Output: a structural view consisting of ATOMs and RELs produced only via SP-FOG operators.
Minimal deterministic rules:
R1 Canonicalization: apply CANON_TEXT, then produce spans with SPAN.
R2 Segmentation: headings→SEC(level); paragraphs→PARA; tables→TABLE/TR/TD; figures→FIG/CAPTION; lists→LIST/LI; equations→EQU.
R3 Containment: structural nesting is expressed with CONTAINS.
R4 Order: linear order is expressed with FOLLOWS.
R5 Labels/numbering: detected labels/numbers become HAS_LABEL, HAS_NUMBER, ANCHOR.
R6 References: bracketed "FIG. 10", "Section 3.2", etc. become mention atoms/spans and are resolved deterministically using REF_SCOPE+RESOLVES_TO or marked with UNRESOLVED_REF.

R7 Validation: enforce WELLNESTED, ACYCLIC(CONTAINS), and TOTAL_ORDER(FOLLOWS); table consistency via WELLFORMED_TABLE.

No semantic inference is needed or allowed.

Temporal Projection Fixed Operator Grammar (TP-FOG V1.0)

1) Purpose

TP-FOG deterministically projects a document into a temporal representation view that encodes time-bearing atoms (events, timepoints, durations, schedules, deadlines, recurrence rules) and temporal relations/constraints (before/after/within/deadline/overlap), strictly from document content. Key restriction: TP-FOG does not infer unstated times. If a time reference is incomplete, it is represented as partial and/or unresolved, not guessed.

2) Data Model

Temporal Atom (T-Atom) TATOM(tid, ttype, span, attrs)
tid: stable identifier
ttype: one of the temporal atom types
span: source span pointer into canonicalized text or object region
attrs: key/values (timezone, granularity, fields present, etc.)
Temporal Relation/Constraint (T-Rel) TREL(rtype, src_tid, dst_tid, attrs)
Temporal View Output A deterministic graph: (TATOM*, TREL*) plus validation results.

3) Operator Set (60 Operators)

A. Canonicalization & Spans (10)
1. CANON_TEXT(doc)—canonical text stream
2. SPAN(start,end)—source span pointer
3. TOKENIZE(span)—deterministic tokenization
4. NORM_WS(span)—whitespace normalization
5. NORM_CASE(span, mode)—lower/upper/preserve
6. NORM_NUM(span, mode)—numeric normalization (e.g., “Feb 2”→“02” where permitted)
7. NORM_PUNCT(span, mode)—punctuation normalization
8. HASH(span, algo)—stable hash (e.g., SHA-256)
9. LEX_CLASSIFY(span, class)—deterministic lexical class tag (DATE_WORD, TIME_WORD, TZ_WORD, RANGE_WORD, RECUR_WORD, etc.)
10. EXTRACT_PATTERN(span, pattern_id)—deterministic pattern extraction (pattern library is fixed/versioned)

B. Temporal Atoms: Time, Duration, Interval, Event (16)
11. DOC_TIME_CONTEXT( )—root context atom for temporal view
12. TIMEPOINT( )—timepoint atom (may be partial)
13. DATE( )—date atom (Y/M/D fields may be partial)
14. TIME_OF_DAY( )—time-of-day atom (H/M/S partial allowed)
15. TIMEZONE( )—timezone atom (IANA, UTC offset, or named zone if explicitly present)
16. DURATION( )—duration atom (e.g., “3 hours”, “2 weeks”)
17. INTERVAL( )—interval atom (start/end timepoints, may be open-ended)
18. EVENT( )—event atom (a time-bearing occurrence described in text)
19. DEADLINE( )—deadline atom (specialization of event/constraint)
20. SCHEDULE( )—schedule atom (container)
21. RECUR( )—recurrence atom (rule-like structure)
22. WINDOW( )—allowable window atom (“between 9 and 5”)
23. HOLIDAY( )—explicit named holiday atom only if named in text (no calendar inference)
24. RELATIVE_REF( )—relative reference atom (“tomorrow”, “next week”)
25. ANCHOR(tatom, anchor_id)—stable anchor id
26. SET_FIELD(tatom, field, value)—set a field (year, month, day, hour, minute, tz_offset, etc.)

C. Core Relations Between Atoms (12)
27. HAS_TEXT(tatom, span)—bind to source text span
28. PART_OF(child, parent)—containment (e.g., time-of-day part of timepoint)
29. REFERS_TO(src, dst)—reference link (event refers to timepoint)
30. SAME_AS(a,b)—explicit equivalence (e.g., repeated mention resolved deterministically)
31. UNRESOLVED(tatom, reason_code)—unresolved/partial marker
32. SCOPE(context_atom, tatom)—assigns scope for resolution
33. RESOLVES_TO(relref, target)—deterministic resolution result
34. IN_CONTEXT(tatom, context_atom)—context association
35. SOURCE_ORDER(a,b)—preserves document order (useful for tie-breaking, not semantics)
36. HAS_GRANULARITY(tatom, granularity)—YEAR/MONTH/DAY/HOUR/MIN/SEC
37. HAS_CONFIDENCE(tatom, level)—fixed discrete levels for extraction certainty (e.g., EXACT/PARTIAL/AMBIGUOUS) based on rule coverage, not ML
38. TAG(tatom, tag_id)—fixed tag set (DEADLINE_WORDING, RANGE_WORDING, etc.)

D. Temporal Constraints (14)
39. BEFORE(a,b)—a strictly before b
40. AFTER(a,b)
41. ON_OR_BEFORE(a,b)
42. ON_OR_AFTER(a,b)
43. EQUAL_TIME(a,b)
44. STARTS_AT(interval, timepoint)
45. ENDS_AT(interval, timepoint)
46. DURING(event_or_interval, interval)
47. OVERLAPS(interval_a, interval_b)
48. MEETS(interval_a, interval_b)—end==start
49. WITHIN(event_or_timepoint, window)—allowable window membership
50. HAS_DURATION(interval_or_event, duration)
51. DEADLINE_FOR(deadline, event_or_task)—binds deadline to governed item
52. RECURRENCE_OF(recur, event_or_schedule)—recurrence applies to target E. Recurrence Rule Operators (6)
53. RRULE_FREQ(recur, freq)—DAILY/WEEKLY/MONTHLY/YEARLY
54. RRULE_INTERVAL(recur, n)—every n units
55. RRULE_BYDAY(recur, dayset)—MO/TU/ . . .
56. RRULE_BYMONTH(recur, monthset)
57. RRULE_UNTIL(recur, timepoint)—explicit end
58. RRULE_COUNT(recur, n)—explicit count F. Validation & Emission (2)
59. ASSERT(pred)—boolean assertion over constructed graph 60. EMIT_TEMPORAL_VIEW( )—emits the temporal projection artifact for this view 4) Deterministic Construction Rules T1 Canonicalize: CANON_TEXT then span/token pipeline (SPAN, TOKENIZE, normalizers).

T2 Detect explicit temporal tokens: use fixed, versioned patterns via EXTRACT_PATTERN+LEX_CLASSIFY. Examples of pattern IDs: P_DATE_ISO, P_DATE_TEXTUAL, P_TIME_HHMM, P_TZ_OFFSET, P_RANGE, P_RELATIVE, P_RRULE_WORDING.

T3 Build atoms: create DATE, TIME_OF_DAY, TIMEZONE, combine into TIMEPOINT via PART_OF and SET_FIELD.

T4 Build intervals/windows: ranges ("from X to Y", "between X and Y") become INTERVAL or WINDOW+STARTS_AT/ENDS_AT.

T5 Build events: an EVENT is created only when the document contains an explicit event token (e.g., "meeting", "deployment", "inspection", "shipment") in a fixed dictionary, or when the document has an explicit syntactic event form (also fixed). Otherwise, time references stand alone as timepoints/intervals.

T6 Constraints: temporal connectives map to constraints (BEFORE, ON_OR_AFTER, WITHIN, etc.).

T7 Relative references: "tomorrow/next week/within 30 days" become RELATIVE_REF and are not converted to absolute dates unless an explicit anchoring timepoint exists in the document's temporal context; otherwise mark UNRESOLVED.

T8 Recurrence: explicit recurrence language ("every Monday", "weekly", "until . . . ", "for 10 times") maps to RECUR and RRULE operators.

T9 Validate: ASSERT properties such as:
- no interval has two conflicting starts/ends
- RRULE_UNTIL and RRULE_COUNT don't violate fixed rule constraints (if you choose to constrain them)
- if TIMEZONE appears, it must be attached to a TIMEPOINT or context T10 Emit: EMIT_TEMPORAL_VIEW.

Process-Based Projection Fixed Operator Grammar (PP-FOG V1.0)

1) Purpose

PP-FOG deterministically projects a document into a process representation view that encodes process atoms (process, step, action, decision, branch, loop, checkpoint), flow relations (next, depends-on, start/end, entry/exit), artifacts consumed/produced (inputs/outputs), roles/actors responsible for steps, and process constraints expressed in text (must/shall/only if/unless).

Key restriction: PP-FOG does not infer steps that are not stated. If ordering/conditions are ambiguous, it records an explicit ambiguity/unresolved marker rather than guessing.

2) Data Model

Process Atom (P-Atom) PATOM(pid, ptype, span, attrs)

ptype: PROCESS, STEP, ACTION, DECISION, BRANCH, LOOP, CHECKPOINT, INPUT, OUTPUT, ROLE, STATE (optional), etc.

span: canonical source span pointer attrs: key/values (step_number, modality, obligation level, etc.)

Process Relation/Constraint (P-Rel) PREL(rtype, src_pid, dst pid, attrs)

3) Operator Set (60 Operators)

A. Canonicalization & Spans (8)
1. CANON_TEXT(doc)
2. SPAN(start,end)
3. TOKENIZE(span)
4. NORM_WS(span)
5. NORM_CASE(span, mode)
6. NORM_PUNCT(span, mode)
7. NORM_NUM(span, mode)
8. HASH(span, algo)

B. Lexical/Pattern Extraction (6)
9. LEX_CLASSIFY(span, class)—STEP_WORD, CONDITION_WORD, LOOP_WORD, ACTOR_WORD, INPUT_WORD, OUTPUT_WORD, MODAL_WORD . . .
10. EXTRACT_PATTERN(span, pattern_id)—fixed pattern library, versioned
11. MATCH_ENUM(span, enum_id)—matches a fixed enumeration (e.g., SHALL/MUST/MAY)
12. ANCHOR(patom, anchor_id)—stable anchor id
13. HAS_TEXT(patom, span)—binds to source
14. TAG(patom, tag_id)—fixed tag set for traceability (e.g., "LIST_ITEM_STEP")

C. Process Atoms (16)
15. PROCESS( )—process container atom
16. STEP( )—step atom
17. ACTION( )—action atom (operation verb phrase)
18. DECISION( )—decision point
19. BRANCH( )—branch container
20. BRANCH_CASE( )—one branch alternative ("if", "else", "otherwise")
21. LOOP( )—loop container
22. CHECKPOINT( )—verification/approval point
23. ENTRY( )—entry point
24. EXIT( )—exit point
25. ROLE( )—actor/role atom
26. ARTIFACT( )—generic artifact
27. INPUT( )—input artifact (specialization)
28. OUTPUT( )—output artifact (specialization)
29. PRECONDITION( )—explicit precondition atom
30. POSTCONDITION( )—explicit postcondition atom D. Composition & Structure (8)
31. CONTAINS(parent, child)—hierarchy containment
32. PART_OF(child, parent)—inverse convenience (optional but useful)
33. SOURCE_ORDER(a,b)—preserves document order
34. STEP_NUMBER(step, n)—explicit numbering if present
35. NAME(node, text_span)—label/name for node
36. REFERS_TO(a,b)—reference link between process elements
37. SAME_AS(a,b)—deterministic equivalence resolution
38. UNRESOLVED(node, reason_code)—ambiguity or missing linkage E. Control-Flow Relations (10)
39. STARTS_WITH(process, entry)
40. ENDS_WITH(process, exit)
41. NEXT(a,b)—explicit sequential step ("then", numbering, bullets with order markers)
42. PRECEDES(a,b)—inverse convenience 43. DEPENDS_ON(a,b)—"after completing A, do B"
44. BLOCKS(a,b)—A inhibits B unless satisfied
45. ENTER(branch_or_loop, node)—entry edge into construct
46. EXIT_TO(branch_or_loop, node)—exit edge to continuation
47. TRUE_EDGE(decision, branch_case)
48. FALSE_EDGE(decision, branch_case)—can also represent ELSE F. Conditions & Modalities (8)

49. CONDITION(cond_atom)—condition expression atom (textual, non-inferred)
50. IF(branch_case, cond_atom)—attaches condition to case
51. UNLESS(branch_case, cond_atom)—exception guard
52. REQUIRES(node, cond_atom)—precondition requirement
53. ENSURES(node, cond_atom)—postcondition guarantee
54. MODALITY(node, modal)—MUST/SHALL/MAY/OPTIONAL/PROHIBITED
55. EXCLUSIVE(branch)—exactly one branch case may be taken
56. PARALLEL(group)—indicates explicit parallelism if text states it G. Artifacts & Responsibility (4)

57. CONSUMES(node, input_artifact)
58. PRODUCES(node, output artifact)
59. ASSIGNED_TO(node, role)
60. EMIT_PROCESS_VIEW( )—emits the process projection artifact 4) Deterministic Construction Rules P1 Canonicalize text (CANON_TEXT) and create spans (SPAN) from the document stream.

P2 Detect process regions using fixed patterns:
- ordered lists ("1.", "(a)", "Step 1", "First/Second/Next"),
- imperative verb phrases,
- keywords ("procedure", "workflow", "process", "then", "if", "unless", "repeat", "until"),
- headings like "Procedure", "Steps", "Method".

P3 Construct a PROCESS( ) atom when a process region is detected; otherwise, PP-FOG may still emit isolated STEP( ) atoms if explicitly present.

P4 Create STEP( ) atoms from enumerated items, "Step N" markers, or explicit step sentences; bind text via HAS TEXT.

P5 Extract control flow:
- numbered order→NEXT(step_i, step_{i+1})
- explicit "then/after/before" phrasing→NEXT/DEPENDS_ON
- "if/else"→DECISION+BRANCH+BRANCH_CASE+IF/TRUE_EDGE/FALSE_EDGE
- "repeat/until/for each"→LOOP with ENTER/EXIT_TO edges P6 Extract conditions only as explicit CONDITION atoms from text spans (no boolean synthesis).

P7 Extract roles when the document explicitly assigns responsibility ("operator shall . . . ", "admin must . . . "); attach with ASSIGNED_TO.

P8 Extract artifacts when text explicitly says inputs/outputs ("provide X", "generate Y"); attach with CONSUMES/PRODUCES.

P9 Ambiguity policy:
- if a step order is not determinable from explicit markers, record SOURCE_ORDER and mark missing edges as UNRESOLVED (reason_code=ORDER_AMBIGUOUS)
- if a condition references an object not resolvable deterministically, mark UNRESOLVED (reason_code=REF_AMBIGUOUS)

P10 Emit with EMIT_PROCESS_VIEW( ).

State-Based Projection Fixed Operator Grammar (SB-FOG V1.0)

1) Purpose

SB-FOG deterministically projects a document into a state-based representation view that encodes state atoms (named states, composite states, initial/terminal states), transitions between states, guards/conditions and effects (only when explicitly stated), state invariants (constraints that must hold in a state), events/triggers that cause transitions (only when explicit), and unresolved markers when the document is ambiguous.

Key restriction: SB-FOG does not infer a state machine that isn't stated. It does not "complete" missing transitions. It encodes only what the document provides, and flags gaps explicitly.

2) Data Model

State Atom (S-Atom) SATOM(sid, stype, span, attrs)
- stype: MACHINE, STATE, COMPOSITE_STATE, REGION, INITIAL, TERMINAL, INVARIANT, TRIGGER, EFFECT, VARIABLE, VALUE . . .
- span: source span pointer
- attrs: key/values (name, modality, determinism tags, etc.)

State Relation/Constraint (S-Rel) SREL(rtype, src_id, dst_id, attrs) (e.g., HAS_STATE, TRANSITION, HAS_GUARD, HAS_EFFECT, ENTERS, EXITS . . . )

3) Operator Set (60 Operators)

A. Canonicalization & Spans (8)

1. CANON_TEXT(doc)
2. SPAN(start,end)
3. TOKENIZE(span)
4. NORM_WS(span)
5. NORM_CASE(span, mode)
6. NORM_PUNCT(span, mode)
7. NORM_NUM(span, mode)
8. HASH(span, algo)

B. Lexical/Pattern Extraction (6)

9. LEX_CLASSIFY(span, class)—STATE_WORD, TRANSITION_WORD, GUARD_WORD, EVENT_WORD, INVARIANT_WORD, MODAL_WORD . . .
10. EXTRACT_PATTERN(span, pattern_id)—fixed/versioned patterns (e.g., "when X", "if Y", "in state S")
11. MATCH_ENUM(span, enum_id)—fixed enums (MUST/SHALL/MAY; ENTER/EXIT; ENABLE/DISABLE)
12. ANCHOR(satom, anchor_id)—stable anchor id
13. HAS_TEXT(satom, span)—binds atom to source
14. TAG(satom, tag_id)—fixed tags for traceability C. Core State Atoms (18)

15. STATE_MACHINE( )—top-level machine/container
16. STATE( )—simple state atom

17. COMPOSITE_STATE( )—composite state
18. REGION( )—region/orthogonal region container (only if explicit)
19. INITIAL( )—initial pseudo-state (only if explicit)
20. TERMINAL( )—terminal/final pseudo-state (only if explicit)
21. TRANSITION( )—transition atom (edge as first-class object)
22. TRIGGER( )—trigger/event atom
23. GUARD( )—guard condition atom
24. EFFECT( )—effect/action atom
25. INVARIANT( )—state invariant atom
26. VARIABLE( )—state variable atom
27. VALUE( )—value atom
28. MODE( )—mode atom (optional synonym of STATE; include to capture "mode" language)
29. PHASE( )—phase atom (optional synonym; helpful in specs)
30. ERROR_STATE( )—explicit error/fault state (only if explicit)
31. CHECKPOINT( )—explicit checkpoint state (only if explicit)
32. UNRESOLVED(node, reason_code)—unresolved marker atom (as node)

D. Structure & Identification (8)

33. CONTAINS(parent, child)—hierarchical containment
34. PART_OF(child, parent)—inverse convenience
35. NAME(node, text_span)—name/label
36. REFERS_TO(a,b)—reference link
37. SAME_AS(a,b)—deterministic equivalence resolution
38. SOURCE_ORDER(a,b)—document order
39. HAS_GRANULARITY(node, level)—e.g., STATE vs MODE vs PHASE (fixed levels)
40. MODALITY(node, modal)—MUST/SHALL/MAY/PROHIBITED/OPTIONAL E. State Machine Relations (14)

41. HAS_STATE(machine, state)—machine membership
42. SUBSTATE_OF(state, composite_state)—nesting
43. HAS_REGION(composite_state, region)—explicit regions
44. REGION_STATE(region, state)—state belongs to region
45. INITIAL_OF(container, initial)—initial pseudo-state attached to machine/composite/region
46. TERMINAL_OF(container, terminal)—terminal pseudo-state attached
47. FROM(transition, state)—source state
48. TO(transition, state)—destination state
49. ON_TRIGGER(transition, trigger)—trigger causes transition
50. HAS_GUARD(transition, guard)—guard condition
51. HAS_EFFECT(transition, effect)—effect on transition
52. INVARIANT_OF(state, invariant)—invariant holds in state
53. ENTERS(transition, state)—explicit "entering S" semantics (only if stated)
54. EXITS(transition, state)—explicit "exiting S" semantics (only if stated)

F. Variables and Constraints (5)

55. READS(effect_or_guard, variable)—explicit read reference
56. WRITES(effect, variable)—explicit write reference
57. ASSIGNED_VALUE(variable, value)—explicit assignment/value
58. REQUIRES(node, guard_or_invariant)—requirement binding (e.g., "only if")
59. ASSERT(pred)—boolean assertion for validation checks G. Emission (1)

60. EMIT_STATE_VIEW( )—emits the state-based representation view artifact

4) Deterministic Construction Rules

S1 Canonicalize and create spans: CANON_TEXT, SPAN, token/normalization operators.

S2 Detect explicit state language using fixed patterns/classes:
- state declarations: "state S", "mode M", "phase P", "system is in S"
- transitions: "transitions from A to B", "moves to", "enters", "exits"
- triggers: "when X occurs", "upon X", "on event X"
- guards: "if", "only if", "unless"
- invariants: "in state S, condition C holds", "while in S, must . . . "

S3 Create STATE_MACHINE( ) when the document contains explicit state-machine constructs; otherwise, SB-FOG can still emit isolated STATE( ) and TRANSITION( ) atoms if explicitly stated.

S4 Build STATE( ) atoms (and MODE( )/PHASE( ) if those terms are used) with NAME and HAS_TEXT.

S5 Build TRANSITION(atoms only when a transition is explicitly stated; bind endpoints via FROM/TO.

S6 Attach triggers/guards/effects when explicit:
- trigger phrases→TRIGGER+ON_TRIGGER
- conditional phrases→GUARD+HAS_GUARD
- effect phrases ("set X", "reset Y", "emit alarm")→EFFECT+HAS_EFFECT S7 Invariants: if the doc says "in state S, must satisfy . . . " →INVARIANT+INVARIANT_OF(S, invariant)+MODALITY(invariant, MUST/SHALL as present).

S8 Variables: create VARIABLE atoms only when explicitly named; connect via READS/WRITES/ASSIGNED_VALUE only when stated.

S9 Ambiguity policy:
- if a transition is stated but missing endpoints→record UNRESOLVED (reason_code=ENDPOINT_MISSING)
- if a guard references an unresolved variable→UNRESOLVED(reason_code=REF_AMBIGUOUS)
- if multiple candidate referents exist→UNRESOLVED (reason_code=NON_UNIQUE_REF)

S10 Validate (examples of ASSERT checks you can state in the spec without narrowing too hard):

each TRANSITION has at most one FROM and one TO
- INITIAL appears only as attached via INITIAL_OF
- no illegal nesting cycles via CONTAINS/PART_OF (if you want to add such checks in prose)

S11 Emit with EMIT_STATE_VIEW( ).

5) What the Emitted State View can Look Like

Node list: STATE_MACHINE, STATE/MODE/PHASE, TRANSITION, TRIGGER, GUARD, EFFECT, INVARIANT, VARIABLE, VALUE Edge list: HAS_STATE, FROM/TO, ON_TRIGGER, HAS_GUARD, HAS_EFFECT, INVARIANT_OF, READS/WRITES, etc.

Unresolved list: UNRESOLVED atoms with reason codes
Anchors: stable identifiers for deterministic cross-view referencing
1. a fixed list of pattern IDs (e.g., P_STATE_DECL, P_TRANSITION_FROM_TO, P_ON_TRIGGER, P_IN_STATE_INVARIANT, P_ONLY_IF_GUARD, etc.), and
2. a worked example: 8-10 lines of a spec paragraph→emitted SATOM/SREL records.

Resource-Oriented Projection Fixed Operator Grammar (RP-FOG V1.0)

1) Purpose

RP-FOG deterministically projects a document into a resource-oriented representation view that encodes resource types (CPU, memory, storage, bandwidth, energy, tokens, licenses, GPU hours, etc.), resource instances/pools (cluster A, node N1, budget pool P), quantities/units (16 GB, 10 cores, 5 TPS), constraints (min/max, quota, limit, must-not-exceed), allocations/reservations (assign X to task Y), consumption/production of resources (explicit only), and unresolved resource references where incomplete or ambiguous Key restriction: RP-FOG does not infer missing units, missing magnitudes, or implicit conversions. If the doc says "high memory," it records an unresolved/qualitative requirement, not a number.

2) Data Model

Resource Atom (R-Atom) RATOM(rid, rtype, span, attrs)
rtype: RESOURCE_TYPE, RESOURCE_POOL, RESOURCE_INSTANCE, QUANTITY, UNIT, REQUIREMENT, LIMIT, QUOTA, ALLOCATION, RESERVATION, TASK, COST, RATE . . .
span: source span pointer
attrs: key/values (dimension, numeric value, unit symbol, scope, etc.)
Resource Relation/Constraint (R-Rel) RREL(rel_type, src_rid, dst_rid, attrs)

3) Operator Set (60 Operators)

A. Canonicalization & Spans (8)
1. CANON_TEXT(doc)
2. SPAN(start,end)
3. TOKENIZE(span)
4. NORM_WS(span)
5. NORM_CASE(span, mode)
6. NORM_PUNCT(span, mode)
7. NORM_NUM(span, mode)
8. HASH(span, algo)

B. Lexical/Pattern Extraction (7)
9. LEX_CLASSIFY(span, class)—RESOURCE_WORD, UNIT_WORD, LIMIT_WORD, RATE_WORD, COST_WORD, MODAL_WORD . . .
10. EXTRACT_PATTERN(span, pattern_id)—fixed/versioned patterns (e.g., "at least X", "no more than Y", "X GB", "X cores")
11. MATCH_ENUM(span, enum_id)—fixed enums (MUST/SHALL/MAY; MIN/MAX; PER/IN/OF)
12. ANCHOR(ratom, anchor_id)—stable anchor id
13. HAS_TEXT(ratom, span)—bind to source
14. TAG(ratom, tag_id)—fixed tags
15. UNRESOLVED(node, reason_code)—unresolved marker atom C. Core Resource Atoms (16)

16. RESOURCE_VIEW( )—root/container atom
17. RESOURCE_TYPE( )—e.g., CPU, Memory, Storage, Bandwidth, Energy, License
18. RESOURCE_DIM( )—dimension/category (COMPUTE, MEMORY, STORAGE, NETWORK, ENERGY, LICENSE, OTHER)
19. RESOURCE_POOL( )—shared pool (cluster, budget pool, license pool)
20. RESOURCE_INSTANCE( )—specific instance (node, disk, NIC, license seat)
21. TASK( )—consumer/subject of allocation (job, component, module)
22. REQUIREMENT( )—requirement statement atom
23. LIMIT( )—limit/ceiling atom
24. QUOTA( )—quota atom
25. ALLOCATION( )—allocation atom
26. RESERVATION( )—reservation atom
27. QUANTITY( )—numeric quantity atom
28. UNIT( )—unit atom (GB, cores, Mbps, kWh, $/month, etc.)
29. RATE( )—rate atom (per second, per hour, TPS, MB/s)
30. COST( )—cost atom (currency+amount or rate)
31. THRESHOLD( )—threshold atom (explicit "threshold" language)

D. Identification & Structure (7)
32. NAME(node, text_span)—label
33. CONTAINS(parent, child)—containment (e.g., pool contains instances)
34. PART_OF(child, parent)—inverse convenience
35. REFERS_TO(a,b)—reference link
36. SAME_AS(a,b)—deterministic equivalence resolution
37. SOURCE_ORDER(a,b)—preserves document order
38. SCOPE(context, node)—scope binding (system-wide, per-task, per-tenant)

E. Quantities, Units, and Dimensions (10)
39. HAS_DIMENSION(resource_type_or_req, resource_dim)—e.g., CPU→COMPUTE
40. HAS_UNIT(quantity_or_rate_or_cost, unit)—attach unit
41. VALUE_NUM(quantity, n)—numeric literal (as stated)
42. VALUE_TEXT(node, span)—textual value (e.g., "high", "low", "best effort")
43. UNIT_SYMBOL(unit, symbol)—"GB", "MiB", "cores", "MB/s"
44. RATE_OF(rate, quantity, per unit)—"MB per second"
45. COST_OF(cost, quantity, currency_unit)—"$ per month" or "$100"
46. CONVERSION_DECL(from_unit, to_unit, factor)—only if explicitly declared in document
47. NORMALIZE_UNIT(quantity, unit)—normalize only when allowed by declared conversions
48. GRANULARITY(node, level)—e.g., PER_SYSTEM/PER_TASK/PER_INSTANCE PER_USER F. Constraints & Comparisons (10)
49. MIN(req_or_limit, quantity)—at least
50. MAX(req_or_limit, quantity)—at most
51. EQUAL(req_or_limit, quantity)—exactly
52. RANGE(req_or_limit, qmin, qmax)—explicit range 53. NOT_EXCEED(req_or_limit, quantity)—must not exceed
54. AT_LEAST(req_or_limit, quantity)—synonym of MIN (keep if you want explicit language mapping; otherwise you can drop and reuse MIN)
55. AT_MOST(req_or_limit, quantity)—synonym of MAX (same note)
56. MODALITY(node, modal)—MUST/SHALL/MAY/PROHIBITED/OPTIONAL
57. ASSERT(pred)—validation predicate G. Allocation & Usage Relations (4)

58. ALLOCATES(allocation_or_reservation, resource_pool_or_instance, quantity)
59. ASSIGNED_TO(allocation_or_reservation, task)
60. EMIT_RESOURCE_VIEW( )—emits the resource projection artifact 4) Deterministic Construction Rules R1 Canonicalize: CANON_TEXT, spans/tokens, normalization operators.

R2 Identify resource statements using fixed patterns:

quantity+unit: "16 GB", "8 cores", "500 Mbps"

comparative constraints: "at least", "no more than", "must not exceed", "exactly"

allocation phrasing: "allocate", "reserve", "assign"

quotas/limits: "quota", "limit", "cap", "budget"

rates: "per second", "MB/s", "requests per minute"

costs: "$X", "per month"

R3 Create resource types/pools/instances only when explicitly named; otherwise create RESOURCE_TYPE alone and attach requirement to the type.

R4 Build requirements:

a requirement statement becomes REQUIREMENT( )

attach dimension/type via HAS_DIMENSION/REFERS_TO attach quantities via QUANTITY+HAS_UNIT+VALUE_NUM attach constraints via MIN/MAX/EQUAL/RANGE/NOT_EXCEED R5 Handle qualitative requirements ("high memory", "low latency") with VALUE_TEXT and mark UNRESOLVED (reason_code=QUALITATIVE_REQUIREMENT) unless a numeric mapping is explicitly provided in the document.

R6 Allocation/reservation:

create ALLOCATION or RESERVATION link with ALLOCATES( . . . , pool_or_instance, quantity)

link to a TASK with ASSIGNED_TO

R7 Unit normalization only when the doc declares conversions via CONVERSION_DECL; otherwise preserve as-stated units.

R8 Validate with ASSERT checks such as:

each QUANTITY has at most one numeric value each constraint node has consistent min/max ordering if both present each allocation has a target pool/instance and a quantity or is marked UNRESOLVED (reason_code=ALLOCATION_INCOMPLETE)

R9 Emit: EMIT_RESOURCE_VIEW( ).

Functional Projection Fixed Operator Grammar (FP-FOG V1.0)

1) Purpose

FP-FOG deterministically projects a document into a functional representation view that encodes functional units (functions/capabilities/modules/services/interfaces), inputs/outputs and their types/structures (as explicitly stated), mappings/transformations (as declared, not inferred), constraints (preconditions, postconditions, invariants, allowed ranges), error/exception outputs when explicitly described, and unresolved markers when the document omits required fields.

Key restriction: FP-FOG does not infer missing IO types, missing mappings, or implied behavior. It records ambiguity explicitly.

2) Data Model

Functional Atom (F-Atom) FATOM(fid, ftype, span, attrs)

ftype: FUNCTION, INTERFACE, INPUT, OUTPUT, PARAM, TYPE, FIELD, CONSTRAINT, PRECOND, POSTCOND, INVARIANT, ERROR, MAPPING . . .

span: source span pointer attrs: key/values (name, arity, modality, etc.)

Functional Relation/Constraint (F-Rel) FREL(rtype, src_fid, dst_fid, attrs)

3) Operator Set (60 Operators)

A. Canonicalization & Spans (8)

1. CANON_TEXT(doc)
2. SPAN(start,end)
3. TOKENIZE(span)
4. NORM_WS(span)
5. NORM_CASE(span, mode)
6. NORM_PUNCT(span, mode)
7. NORM_NUM(span, mode)
8. HASH(span, algo)

B. Lexical/Pattern Extraction (7)

9. LEX_CLASSIFY(span, class)—FUNC_WORD, INPUT_WORD, OUTPUT_WORD, TYPE_WORD, COND_WORD, ERROR WORD, MODAL_WORD . . .
10. EXTRACT_PATTERN(span, pattern_id)—fixed/versioned patterns ("input:", "returns", "if . . . then . . . ", "on error")
11. MATCH_ENUM(span, enum_id)—MUST/SHALL/MAY; REQUIRED/OPTIONAL; SUCCESS/ERROR
12. ANCHOR(fatom, anchor_id)—stable anchor id
13. HAS_TEXT(fatom, span)—binds atom to source
14. TAG(fatom, tag_id)—fixed tags
15. UNRESOLVED(node, reason_code)—unresolved marker atom C. Functional Atoms (18)

16. FUNCTION( )—functional unit/capability
17. INTERFACE( )—interface/endpoint/API signature container (only if explicit)
18. SIGNATURE( )—signature atom (name+parameters+return)
19. INPUT( )—input object/value
20. OUTPUT( )—output object/value
21. PARAM( )—parameter atom
22. TYPE( )—type atom (string, integer, struct, message, etc., only as stated)

23. FIELD( )—field atom (for structured types)
24. VALUE( )—literal/default/example value atom (only if explicit)
25. CONSTRAINT( )—generic constraint atom
26. PRECOND( )—precondition atom
27. POSTCOND( )—postcondition atom
28. INVARIANT( )—invariant atom
29. ERROR( )—error/exception atom
30. STATUS( )—status/return-code atom (if explicitly used)
31. MAPPING( )—mapping/transformation atom
32. TRANSFORM( )—transformation operator node (named transform if explicit)
33. SIDE_EFFECT( )—side effect atom (e.g., "updates database") only if explicit D. Structure & Identification (9)

34. NAME(node, text_span)—label/name
35. CONTAINS(parent, child)—containment
36. PART_OF(child, parent)—inverse convenience
37. REFERS_TO(a,b)—reference link
38. SAME_AS(a,b)—deterministic equivalence resolution
39. SOURCE_ORDER(a,b)—preserve document order
40. SCOPE(context, node)—scope binding (module-wide, per-interface, etc.)
41. MODALITY(node, modal)—MUST/SHALL/MAY/PROHIBITED/OPTIONAL
42. ARITY(signature, n)—number of parameters if explicitly determinable E. IO Relations & Typing (10)

43. HAS_INPUT(function_or_signature, input_or param)
44. HAS_OUTPUT(function_or_signature, output)
45. HAS_PARAM(signature, param)
46. RETURNS(signature, output)—return binding
47. HAS_TYPE(typed_node, type)
48. HAS_FIELD(type, field)—structured type field membership
49. FIELD_TYPE(field, type)—field typing
50. DEFAULT_VALUE(param_or_field, value)—explicit default
51. EXAMPLE_VALUE(param_or_field, value)—explicit example
52. OPTIONALITY(param_or_field, flag)—REQUIRED/OPTIONAL (only if explicit)

F. Functional Mappings & Constraints (7)

53. MAPS(mapping, inputs, outputs)—mapping binds a set of inputs to outputs (as stated)
54. APPLIES_TRANSFORM(mapping, transform)—attach explicit named transform
55. HAS_PRECOND(function_or_mapping, precond)
56. HAS_POSTCOND(function_or_mapping, postcond)
57. HAS_INVARIANT(function_or_interface, invariant)
58. ON_ERROR(function_or_mapping, error_or_status)—explicit error behavior
59. ASSERT(pred)—validation predicate G. Emission (1)

60. EMIT_FUNCTIONAL_VIEW( )—emits functional projection artifact

4) Deterministic Construction Rules

F1 Canonicalize: CANON_TEXT, spans/tokens, normalization ops.

F2 Identify functional declarations using fixed patterns:
"function/capability/module/service/interface"
"input/accepts/parameter(s)"
"output/returns/emits"
"precondition/postcondition/invariant"
"on error/exception/status code"

F3 Create FUNCTION(atoms when explicit;
create INTERFACE( )/SIGNATURE( ) only when explicit signature-like structure exists.

F4 Extract inputs/outputs:
each explicitly named input becomes INPUT( ) or PARAM( ) (depending on whether signature-like)
each explicitly named output becomes OUTPUT( ) (or STATUS( ) when explicitly used)

F5 Extract types/fields only when explicitly present; otherwise mark UNRESOLVED (reason_code=TYPE_MISSING) for the IO element.

F6 Extract mapping/transformation:
if the document states "X is computed from Y"/"transform Y into Z"→create MAPPING(and link with MAPS
if a transform is explicitly named ("hash", "encrypt", "normalize", "compress")→TRANSFORM( )+APPLIES_TRANSFORM
otherwise, store the mapping span via HAS_TEXT (mapping, span) without inventing a transform operator.

F7 Constraints:
explicit "must/shall" constraints become CONSTRAINT/PRECOND/POSTCOND/INVARIANT with MODALITY
attach via HAS_PRECOND, HAS_POSTCOND, HAS_INVARIANT F8 Error behavior:
explicit "on error . . . return . . . "→ERROR( ) or STATUS( ) attached via ON_ERROR F9 Ambiguity policy:
if the document indicates a function but IO set is incomplete→UNRESOLVED (reason_code=IO_INCOMPLETE)
if multiple candidates for a referent exist→UNRESOLVED(reason_code=NON_UNIQUE_REF)

F10 Validate using ASSERT checks such as:
each SIGNATURE has at most one RETURNS
each typed node has at most one HAS_TYPE (unless explicitly multiple)
mappings do not reference missing IO nodes without an UNRESOLVED marker F11 Emit: EMIT_FUNCTIONAL_VIEW( ).

Uniform Specification Template for Fixed Operator Grammars

Applicable to Structural, Temporal, Process-Based, State-Based, Resource-Oriented, and Functional Projections.

[Projection Name]Fixed Operator Grammar (Version X.Y)

1. Predefined and Versioned Grammar

In one embodiment, the document transformation system 128 generates the [Projection Name] representation view using a predefined fixed operator grammar comprising a finite, versioned set of operators.

The operator grammar is explicitly enumerated, is bounded in size, is version-identified, and is not modified during execution of a transformation. Each operator in the grammar performs a deterministic transformation or relation-construction step over canonicalized document content.

2. Deterministic Construction

The [Projection Name] representation view is constructed by:

1. Canonicalizing the document into a normalized token stream;
2. Identifying projection-relevant constructs using fixed lexical classes and versioned extraction patterns;
3. Instantiating typed atoms defined by the operator grammar;
4. Creating relations among said atoms strictly as permitted by the predefined operators; and
5. Validating structural constraints defined by the grammar.

The construction process is deterministic, repeatable under identical grammar version and inputs, and free of probabilistic inference.

3. No Inference Policy

The document transformation system 128 does not infer, synthesize, or complete unstated elements within the [Projection Name] representation view.

If the document omits required components for a complete projection element, the document transformation system 128 generates an explicit UNRESOLVED marker, records a machine-readable reason code, and refrains from constructing inferred atoms or relations. Accordingly, the representation view encodes only information explicitly derivable under the fixed operator grammar.

4. Atom and Relation Formalism

The [Projection Name] representation view comprises a set of typed projection atoms; and a set of typed projection relations constructed exclusively via the predefined operator set. Each atom and relation references its source span within the canonicalized document, may contain structured attributes defined by the grammar, and is uniquely identifiable via a stable anchor identifier.

5. Validation and Structural Integrity

The grammar defines projection-specific validation predicates. The validation does not alter document content, does not introduce new semantic content; and ensures internal consistency of the projection view under the defined operator constraints. Where validation detects structural incompleteness or ambiguity, the document transformation system 128 emits explicit unresolved markers rather than inferred corrections.

6. Machine-Readable Emission

Upon completion of deterministic construction and validation, the document transformation system 128 emits a machine-readable [Projection Name] representation artifact, comprising the set of projection atoms, the set of projection relations, any unresolved markers, version identifiers for the operator grammar, and canonicalization metadata. The emitted artifact is independent of other projection views and constitutes a formal projection under its respective fixed operator grammar.

Predefinition and Governance of Fixed Operator Grammars

1. Predefined Operator Grammars

In one embodiment, each representation view of the formal transformer 130 is generated under a predefined fixed operator grammar. Each fixed operator grammar comprises a finite, explicitly enumerated set of operators; is version-identified, is defined prior to execution of a document transformation, and remains immutable during execution of a given transformation run. The operator set defines the permitted projection atom types, the permitted relation types among said atoms, the allowable attribute structures, and the projection-specific validation predicates. The grammar does not expand, adapt, or learn during transformation.

2. Grammar Independence

Each mandatory core representation view is governed by a distinct fixed operator grammar. Accordingly, the structural grammar governs structural projection only, the temporal grammar governs temporal projection only, the state-based grammar governs state projection only, the process-based grammar governs procedural projection only, the resource-oriented grammar governs resource projection only, and the functional grammar governs functional projection only. Generation of one projection does not modify, does not reinterpret, does not inject constraints into, and does not depend upon the internal operator structure of another projection. Each projection constitutes an independent formal projection under its respective fixed operator grammar.

3. Deterministic Execution Model

For a given document input, operator grammar version, canonicalization configuration, and evaluation environment, the resulting representation view is deterministically reproducible. The document transformation system 128 performs no probabilistic inference, no stochastic modeling, and no training-based interpretation during projection generation. All transformations are bounded to the enumerated operators of the selected grammar version.

4. No-Inference and Explicit Unresolved Policy

The operator grammars do not synthesize missing content. Where a document omits required components for a complete projection element, the document transformation system 128 emits an explicit unresolved marker, records a machine-readable reason code, and refrains from completing or inferring unstated structure. Accordingly, the representation view encodes only information explicitly derivable under the fixed operator grammar.

5. Versioning and Non-Retroactive Extension

Each fixed operator grammar is assigned a version identifier, and immutable once released. New operators may be introduced only through issuance of a new grammar version. Earlier versions remain usable and reproducible. Extension of a grammar does not retroactively alter the semantics of prior versions, does not modify previously generated representation artifacts, and the and is does not reinterpret previously processed documents. This guarantees reproducibility, auditability, and technical stability of projection semantics.

6. Projection Artifact Emission

Each projection grammar includes an emission operator that generates a machine-readable representation artifact, identified by grammar version, containing projection atoms, relations, validation results, and unresolved markers. The artifact is suitable for downstream validation, execution gating, compliance checking, or is the other engineered system control.

While specific embodiments have been shown and described, many variations are possible. With time, additional features may be employed. The particular shape or configuration of the platform or the interior configuration may be changed to suit the system or equipment with which it is used.

Having described the inventions in detail, those skilled in the art will appreciate that modifications may be made to the inventions without departing from their spirit. Therefore, it is not intended that the scope of the inventions be limited to the specific embodiments illustrated and described. Rather, it is intended that the scope of these inventions be determined by the appended claims and their equivalents.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

LISTING OF DRAWING ELEMENTS

102 input document
104 deterministic parsing/segmentation
106 independent formal representation views
108 projection-specific constraint evaluation
110 projection-specific admissibility control signals
112 aggregated execution authorization indicator
114 execution-control artifact
116 defined control boundary
118 execution scheduler
120 execution unit
122 dispatch is enabled
124 machine-executable instruction sequence
126 dispatch is inhibited
128 document transformation system
130 formal transformer
202 document-scoped lexical reference table
204 structural
206 temporal
208 state
210 functional
212 process
214 resource
216 each projection evaluated independently under its own constraint system
218 projection-specific admissibility control signals
220 independent projection engines
222
302 domain of activity predefined packages
304 structural activity
306 temporal activity
308 state activity
310 resource activity
312 functional activity
314 process activity

What is claimed is:

1. A computer-implemented method for controlling initiation of an automated downstream machine process based on formal completeness of a natural-language document, the computer-implemented method comprising:

providing, prior to receipt of the natural-language document and for a transformation run executed by one or more processors, a predefined projection definition package comprising:

six immutable fixed operator grammars respectively associated with a structural projection, a temporal projection, a state-based projection, a resource-oriented projection, a functional projection, and a process-based projection, all share a common domain of activity; and six projection-specific canonical dictionaries each exclusively associated with a respective one of the six immutable fixed operator grammars;

wherein:

each immutable fixed operator grammar defines a finite and closed set of permissible operators and associated operand schemas selectable during the transformation run;

each canonical dictionary comprises a finite predefined set of canonical symbols and associated surface-form mappings;

each canonical dictionary defines a separate canonical symbol namespace inaccessible to other projection engines during the transformation run;

canonical symbols and operators of one projection are not addressable, referenceable, or usable by any other projection during the transformation run; and the predefined projection definition package is not modified during the transformation run;

instantiating, for the transformation run, six independent projection engines respectively associated with the six immutable fixed operator grammars and their exclusively associated canonical dictionaries;

receiving, by the one or more processors, the natural-language document comprising natural-language text;

segmenting, by deterministic parsing rules executed by the one or more processors and without probabilistic, heuristic, or learning-based inference, the natural-language document into identifiable lexical units and document units;

independently for each of the six independent projection engines, deterministically binding each lexical unit of the natural-language document, as segmented, exclusively through direct canonical dictionary lookup to canonical symbols of each exclusively associated canonical dictionaries using deterministic lookup rules and predefined precedence rules and tiebreaking rules, wherein:

binding excludes semantic inference, similarity matching, probabilistic ranking, heuristic disambiguation, and cross-projection reconciliation;

ambiguous bindings under the predefined precedence rules result in rejection of each lexical unit that is ambiguous for that projection;

lexical units lacking a predefined canonical binding result in rejection of each lexical unit that lacks the predefined canonical binding for that projection;

rejection of a lexical unit for a projection prevents generation of any projection-specific atom dependent on that lexical unit within that projection engine; and canonical binding for one projection engine is performed without reference to canonical bindings, intermediate symbolic representations, or canonical symbol selections of any other projection engine;

deterministically generating, within each projection engine and using only its respective predefined immutable fixed operator grammar and exclusively associated canonical dictionary, a representation view for each of the six independent projection engines, wherein:

each representation view constitutes an independent formal projection of the natural-language document under its respective predefined immutable fixed operator grammar;

each representation view comprises a plurality of projection-specific atoms including an operator selected from the finite and closed set of permissible operators, one or more operands corresponding to canonical symbols of the each exclusively associated canonical dictionaries, and a provenance reference identifying a source location within the natural-language document;

generation of any representation view does not modify, reinterpret, depend upon, or share canonical symbols, operators, or constraint logic with any other projection; and no probabilistic, heuristic, or learning-based inference is performed during generation of each representation view;

emitting, within each projection engine, a projection-scoped canonical unknown symbol conforming to an operand schema defined by its respective predefined immutable fixed operator grammar, without inferring a value or substituting a default value;

when required by a predefined document domain classification, instantiating one or more additional projection engines, each additional projection engine being exclusively associated with:

its respective predefined immutable fixed operator grammar defining a finite closed operator set; and a respective projection-specific canonical dictionary defining the separate canonical symbol namespace inaccessible to other projection engines;

wherein:

each additional projection engine operates independently of the six independent projection engines;

no operator, canonical symbol, or constraint logic of an additional projection engine is shared with or referenceable by any other projection engine; and each additional projection engine participates in admissibility determination through its own projection-specific constraint system without modifying representation views of the six independent projection engines;

determining admissibility of a derived artifact by evaluating projection-specific constraint systems defined exclusively within their respective predefined immutable fixed operator grammars across:

the representation views of the six independent projection engines; and any instantiated domain-specific representation views;

generating, by the one or more processors, an execution-control artifact comprising:

a transformation run identifier;

identifiers of operator grammar versions and canonical dictionary versions applied during the transformation run;

for each representation view, a projection-specific admissibility control signal indicating whether projection-specific constraints are satisfied; and an aggregated execution authorization indicator derived deterministically from the projection-specific admissibility control signals;

after generating the projection-specific admissibility control signals and the aggregated execution authorization indicator, modifying, by the one or more processors, an execution authorization state associated with the automated downstream machine process;

when the aggregated execution authorization indicator indicates inadmissibility for at least one required projection, preventing propagation of a machine execution trigger signal at a control boundary between an execution scheduler and an execution unit such that no machine-executable instruction sequence is dispatched;

when the aggregated execution authorization indicator indicates admissibility across required projections, permitting propagation of the machine execution trigger signal along a defined execution path; and transmitting the execution-control artifact to the automated downstream machine process irrespective of admissibility status;

wherein generation of each representation view and the aggregated execution authorization indicator is a deterministic function of content of the natural-language document and the predefined projection definition package, and excludes probabilistic, heuristic, or learning-based inference during the transformation run.

2. The computer-implemented method of claim 1, wherein generating the representation views does not add semantic meaning, interpretative content, or material information not explicitly present in the natural-language document.

3. The computer-implemented method of claim 1, wherein each representation-specific atom includes the provenance reference identifying the source location within the natural-language document.

4. The computer-implemented method of claim 1, wherein explicit unknown elements are typed according to the representation view in which they are emitted.

5. The computer-implemented method of claim 1, wherein a summary artifact identifies at least one of: unresolved unknown elements, constraint violations, or inadmissibility of one or more representation views.

6. The computer-implemented method of claim 1, wherein no projection-specific canonical symbol selection, projection-specific atom, or projection-specific constraint evaluation state generated by one projection engine is accessible to any other projection engine during the transformation run.

7. A system comprising one or more processors and memory storing instructions that, when executed, cause the system to perform the computer-implemented method of claim 1.

8. A system comprising one or more processors and memory storing instructions that, when executed, cause the system to perform the computer-implemented method of claim 2.

9. A system comprising one or more processors and memory storing instructions that, when executed, cause the system to perform the computer-implemented method of claim 3.

10. A system comprising one or more processors and memory storing instructions that, when executed, cause the system to perform the computer-implemented method of claim 4.

11. A system comprising one or more processors and memory storing instructions that, when executed, cause the system to perform the computer-implemented method of claim 5.

12. A system comprising one or more processors and memory storing instructions that, when executed, cause the system to perform the computer-implemented method of claim 6.

* * * * *